United States Patent [19]
Yamada et al.

[11] Patent Number: 5,748,459
[45] Date of Patent: May 5, 1998

[54] ELECTRIC LEAKAGE CURRENT PREVENTION USING AN EQUIVALENT IMPEDANCE

[75] Inventors: Michio Yamada; Hitoshi Kawaguchi, both of Tokyo, Japan

[73] Assignee: Mitsubishi Denki Kabushiki Kaisha, Tokyo, Japan

[21] Appl. No.: 767,860

[22] Filed: Dec. 17, 1996

[30] Foreign Application Priority Data

Dec. 21, 1995 [JP] Japan ................... 7-333509
Sep. 27, 1996 [JP] Japan ................... 8-256493

[51] Int. Cl.[6] ................... H02M 3/335; H02H 3/04
[52] U.S. Cl. ................... 363/21; 318/490; 363/132
[58] Field of Search ................... 363/21, 132; 327/310; 318/490

[56] References Cited

U.S. PATENT DOCUMENTS

| | | | |
|---|---|---|---|
| 3,946,738 | 3/1976 | Newton et al. | |
| 4,155,852 | 5/1979 | Fischel et al. | |
| 4,540,922 | 9/1985 | Horvath et al. | 318/490 |
| 4,551,633 | 11/1985 | Winter et al. | |
| 4,716,487 | 12/1987 | Horvath et al. | 318/490 |
| 4,833,377 | 5/1989 | Volk, Sr. et al. | 318/747 |
| 5,088,297 | 2/1992 | Maruyama et al. | |
| 5,321,318 | 6/1994 | Montreuil | |
| 5,517,397 | 5/1996 | Quek et al. | 363/21 |

FOREIGN PATENT DOCUMENTS

| | | |
|---|---|---|
| 62-88484 | 6/1987 | Japan . |
| 2-1313395 | 5/1990 | Japan . |
| 2-136072 | 5/1990 | Japan . |
| 3-195393 | 8/1991 | Japan . |

*Primary Examiner*—Stuart N. Hecker
*Attorney, Agent, or Firm*—Burns, Doane, Swecker & Mathis, LLP

[57] ABSTRACT

An electric leakage preventive apparatus comprises an equivalent impedance which is equivalent to a load leakage impedance of a load in a main body; a switching unit for applying voltage to the equivalent impedance; a driving unit for driving the switching unit; and a control unit for generating a switching pattern. The leakage preventive apparatus is capable of simply and surely preventing leakage current since the earthing current is canceled by applying an antiphase voltage to the equivalent impedance.

17 Claims, 35 Drawing Sheets

's,748,459

ELECTRIC LEAKAGE CURRENT PREVENTION USING AN EQUIVALENT IMPEDANCE

BACKGROUND OF THE INVENTION

The present invention relates to electric leakage prevention for a system using a load which is driven by an inverter.

FIG. 41 is a circuit diagram showing a conventional leakage preventive apparatus as disclosed in, for example, Japanese Utility Model Publication 62-88484/(1987), which a circuit diagram is related to an AC servo.

A group of primary windings U, V, W in a leakage preventive transformer are driving lines of a three-phase AC motor 115 and it has been deemed ideal if a total of currents flowing therethrough is kept at zero. However, positive and negative voltages are switched from one to the other at all times because the switch 103 of a transistor is carrying out pulse width modulation and the charge-discharge cycle of a floating capacitance 106 is repeated, whereby the charge-discharge current becomes an overall input of the primary winding group of the leakage preventive transformer.

The secondary winding of the leakage preventive transformer is connected to an external (earth E) and a power supply unit through a DC insulating return capacitor 108. Dots (•) attached to the primary and secondary windings of the leakage preventive transformer represent one end of the winding.

Therefore, the charge-discharge current of the floating capacitance of the motor 115 is forced to return to the power supply unit from the secondary side of the leakage preventive transformer and the current made to return to the power supply 100 via the earth E is decreased.

As stated above, a typical conventional leakage preventive apparatus needs a leakage preventive transformer. The leakage preventive transformer needs current capacitance equal to a load because it is inserted in the current line of the load. Moreover, a high-frequency current flows through floating capacitance and a leakage preventive transformer having excellent high-frequency characteristics is required to be employed. Therefore, such a preventive apparatus tends to become expensive and the disadvantage is that an installation area is limited because it is large in size.

In the case of an inverter-driven compressor in particularly, a built-in motor is contained in the container of the compressor and the motor is usually exposed to and soaked in a refrigerant medium circulating in a refrigeration cycle and refrigerator oil of the compressor and these medium and oil in a gaseous or liquid state tends to cause current leakage. In the case of alternative flon as a new refrigerant medium, the leakage current is expected to increase with the introduction of the new alternative refrigerant medium of flon which mainly contains hydrofluorocarbon due to the deterioration of the properties of the refrigerant medium and an increase in the production of moisture. Accordingly, it is desirous to take measures in low cost and with space-saving.

The difficulty lies in the fact that an increase in leakage current is estimated from any compressors based on conventional design for insulation as the dielectric constant and conductivity of the alternative flon is higher than those of the present products and as compatibility between the new refrigerant medium and the refrigerator oil is problematical. In case design for insulation is altered because of the problems posed, not only cost for design alteration but also a long development period will be required.

Even though reliable design for insulation is accomplished, quality measures such as those taken for moisture during the process of manufacture may become more complicated.

SUMMARY OF THE INVENTION

An object of the present invention made to solve the foregoing problems is to provided an inexpensive small-sized, general-purpose leakage preventive apparatus. Another object of the present invention is to provide an inverter device for a driving load such as a compressor, which is reliable and easy to handle.

An inverter apparatus according to the present invention comprises: an inverter for converting direct current into alternating current to generate the alternating current, a driving load for receiving the AC voltage generated by the inverter, a driving load body for connecting an earthing leakage current to the earth through the capacitive component of the leakage impedance of the driving load, switching means for generating an anti-phase voltage in synchronization with the AC voltage generated by the inverter, and an equivalent impedance unit which has an impedance equivalent to the leakage impedance of the driving load, which is supplied with voltage from the switching means and used for letting current flow into the earthing portion of the driving load body or another earthing portion.

An inverter apparatus according to the present invention comprises: an inverter for converting direct current into alternating current to generate the alternating current, an equivalent impedance unit equivalent to an impedance with respect to the earthing leakage of the load driven by the inverter with one end of the equivalent impedance unit being earthed, and inverted voltage applying means which is connected to the other end of the equivalent impedance unit and used for applying an anti-phase alternating current in synchronization with the AC voltage generated by the inverter.

An inverter apparatus according to the present invention comprises: driving-signal generating means for receiving a switching control signal for causing AC voltage to be generated from an inverter for converting direct current into alternating current to generate the alternating current, switching means for receiving an inverted signal from the driving-signal generating means and converting direct current from an DC power supply into an anti-phase voltage of the AC voltage, and an equivalent impedance unit, one end of which is supplied with the AC voltage generated by the switching means, the other end thereof being earthed, and which has an impedance equivalent to an impedance with respect to the earthing leakage of the load driven by the inverter.

In an inverter apparatus according to the present invention, the equivalent impedance unit has an impedance having elements including at least a capacitor, which impedance is used for generating a current for canceling a current leaking into the earth during the operation of the inverter-driven load.

In an inverter apparatus according to the present invention, the value of the voltage applied to the switching means from the DC power supply is different from the value of the DC voltage switched by the inverter.

In an inverter apparatus according to the present invention, the value of the voltage applied by the inverter to the equivalent impedance unit on the basis of information concerning the value of the voltage applied by the inverter to the driving load is variable.

In an inverter apparatus according to the present invention, the current caused to leak from the inverter-driven load into the earth is detected, so that the voltage applied to the equivalent impedance unit is altered.

In an inverter apparatus according to the present invention, timing at which the voltage generated and applied to the equivalent impedance unit is deviated from the AC voltage of the inverter.

In an inverter apparatus according to the present invention, the value of the current caused to leak from the inverter-driven load into the earth and current variation time are detected, so that the quantity of impedance of the equivalent impedance unit is altered.

An inverter apparatus according to the present invention further comprises delay means for deviating the voltage applied from the AC voltage of the inverter so as to generate an inverted voltage when the driving of the switching means for applying alternating current to the equivalent impedance unit is controlled.

A leakage preventive apparatus according to the present invention comprises: a DC power supply provided for an inverter or a DC power supply provided separately, switching means for switching direct current from the DC power supply to alternating current to convert the direct current into the alternating current, an equivalent impedance unit, one end of which is supplied with the alternating current generated by the switching means, the other end thereof being earthed, and control means which is connected to a control unit for generating AC voltage to be applied by the inverter to a driving load and used for driving the switching means by causing an anti-phase voltage signal to be generated in synchronization with the AC voltage, wherein the equivalent impedance unit has a quantity of impedance for generating an anti-phase current equivalent to the earthing leakage current of the load driven by the inverter.

A leakage preventive apparatus according to the present invention comprises: an equivalent impedance unit having an impedance equivalent to an impedance with respect to the earthing leakage of the load driven by an inverter for switching direct current to alternating current to generate the alternating current, a switching unit for switching the direct current from the DC power supply of the inverter or another DC power supply so as to supply the direct current to the equivalent impedance unit, a driving unit for driving the switching unit, and a control unit for generating a switching pattern of the switching unit on the basis of control information in the control unit of the inverter and supplying the switching pattern to the driving unit.

In a leakage preventive apparatus with respect to a inverter-driven load according to the present invention, the switching pattern of the switching unit generates a current opposite in phase to the earthing leakage current of the load.

A leakage preventive apparatus according to the present invention further comprises a leakage current detecting unit for detecting information concerning the earthing leakage of the inverter-driven load, wherein the operation of controlling the generation of AC voltage according to information from the leakage current detecting unit or the quantity of impedance of the equivalent impedance unit is altered.

A leakage preventive apparatus according to the present invention further comprises the leakage current detecting unit for detecting information concerning the earthing leakage of the inverter-driven load, wherein leakage information is provided for the control unit so as to alter the operation of the switching unit.

A leakage preventive apparatus according to the present invention further comprises the leakage current detecting unit for detecting information concerning the earthing leakage of the inverter-driven load, wherein leakage information is provided for the driving unit so as to alter the operation of the switching unit.

A leakage preventive apparatus according to the present invention further comprises the leakage current detecting unit for detecting information concerning the earthing leakage of the inverter-driven load, wherein leakage information is provided for the equivalent impedance unit so as to alter the quantity of impedance of the equivalent impedance unit.

In a leakage preventive apparatus according to the present invention, a variable power supply is used as the power supply of the switching unit and with the leakage current detecting unit for detecting information concerning earthing leakage, the leakage information is provided for the variable power supply so as to alter the bus voltage of the switching unit.

A leakage preventive apparatus according to the present invention comprises: an equivalent impedance unit equivalent to an impedance with respect to the earthing leakage of the load driven by an inverter, a switching unit for switching a DC power supply so as to supply direct current to the equivalent impedance unit, a driving unit for driving the switching unit, and a control unit for generating a switching pattern of the switching unit on the basis of driving information in the driving unit of the inverter and supplying the switching pattern to the driving unit.

A leakage preventive apparatus according to the present invention comprises: an equivalent impedance unit equivalent to an impedance with respect to the earthing leakage of the load driven by an inverter, a switching unit for switching a DC power supply so as to supply direct current to the equivalent impedance unit, a driving unit for driving the switching unit, and a control unit for generating a switching pattern of the switching unit on the basis of switching information in the switching unit of the inverter and supplying the switching pattern to the driving unit.

In a leakage preventive apparatus according to the present invention, the control unit has delay means.

In a leakage preventive apparatus according to the present invention, the driving unit has delay means.

In a leakage preventive apparatus according to the present invention, at least a capacitor is connected in series between each phase of the equivalent impedance unit and the earth, a resistor and a coil are connected in series to a phase-to-phase neutral point.

A leakage preventive apparatus according to the present invention further comprises: a first leakage impedance circuit via switching means out of a DC power supply and a second leakage impedance circuit out of the DC power supply, wherein part of the first and second leakage impedance circuits is arranged for common use.

A leakage preventive apparatus according to the present invention further comprising: a transistor in each phase of the switching unit, a diode connected in parallel to a resistor between each phase of the equivalent impedance unit and the earth, at least a serial capacitor, and a resistor between each phase and the bus of the switching unit.

In a leakage preventive apparatus according to the present invention, a resistor, a capacitor and a coil are connected in series between each phase of the equivalent impedance unit and the earth.

In a leakage preventive apparatus according to the present invention, the resistor, the coil or the diode connected in series between each phase of the equivalent impedance unit and the earth and the bus is arranged for common use.

In a leakage preventive apparatus according to the present invention, an integrating circuit is used for the driving unit.

In a leakage preventive apparatus according to the present invention, the value of each element of the equivalent impedance unit is made variable.

In a leakage preventive apparatus according to the present invention, the total number of switches of the switching unit is not greater than N with respect to a N-phase load.

In a leakage preventive apparatus according to the present invention, an equivalent impedance unit and a control unit for controlling the driving of the switching unit for applying voltage to the equivalent impedance unit are integrated in the same IC.

In a leakage preventive apparatus according to the present invention, a control unit for controlling the driving of the switching unit for applying voltage to the equivalent impedance unit and a control unit for controlling the driving of the inverter are integrated in the same IC.

A leakage preventive method according to the present invention comprises the steps of: applying AC voltage generated by an inverter to a driving load, generating a phase-inverted voltage in synchronization with the AC voltage, setting an equivalent impedance unit into which a current equivalent to the earthing leakage current caused to flow when the AC voltage is applied to the driving load is made to flow when the inverted voltage is applied, and earthing the driving load and the equivalent impedance so that the earthing leakage current and the equivalent current can cancel each other.

A leakage preventive method with respect to the inverter-driven load according to the present invention further comprises the step of varying the voltage applied to the equivalent impedance unit so as to make the voltage follow the variation of the current which leaks from the inverter-driven load into the earth.

In an inverter apparatus according to the present invention, the inverter-driven load is a motor of a compressor in which a refrigerant carrier mainly comprising hydrofluorocarbon or hydrocarbon is compressed before being circulated therein.

A leakage preventive apparatus according to the present invention comprises leakage impedance circuits respectively provided between one end of the DC power supply and the earth and between the other end thereof and the earth via switching means, wherein at least part of each of the impedance circuits is arranged for common use.

A leakage preventive apparatus according to the present invention comprises: a PNP type switching element and an NPN type switching element respectively provided between one and the other ends of the DC power supply, and a leakage impedance circuit connected from between the two switching elements and to the earth.

DETAILED DESCRIPTION OF PREFERRED EMBODIMENTS

Embodiment 1

Figure 1:
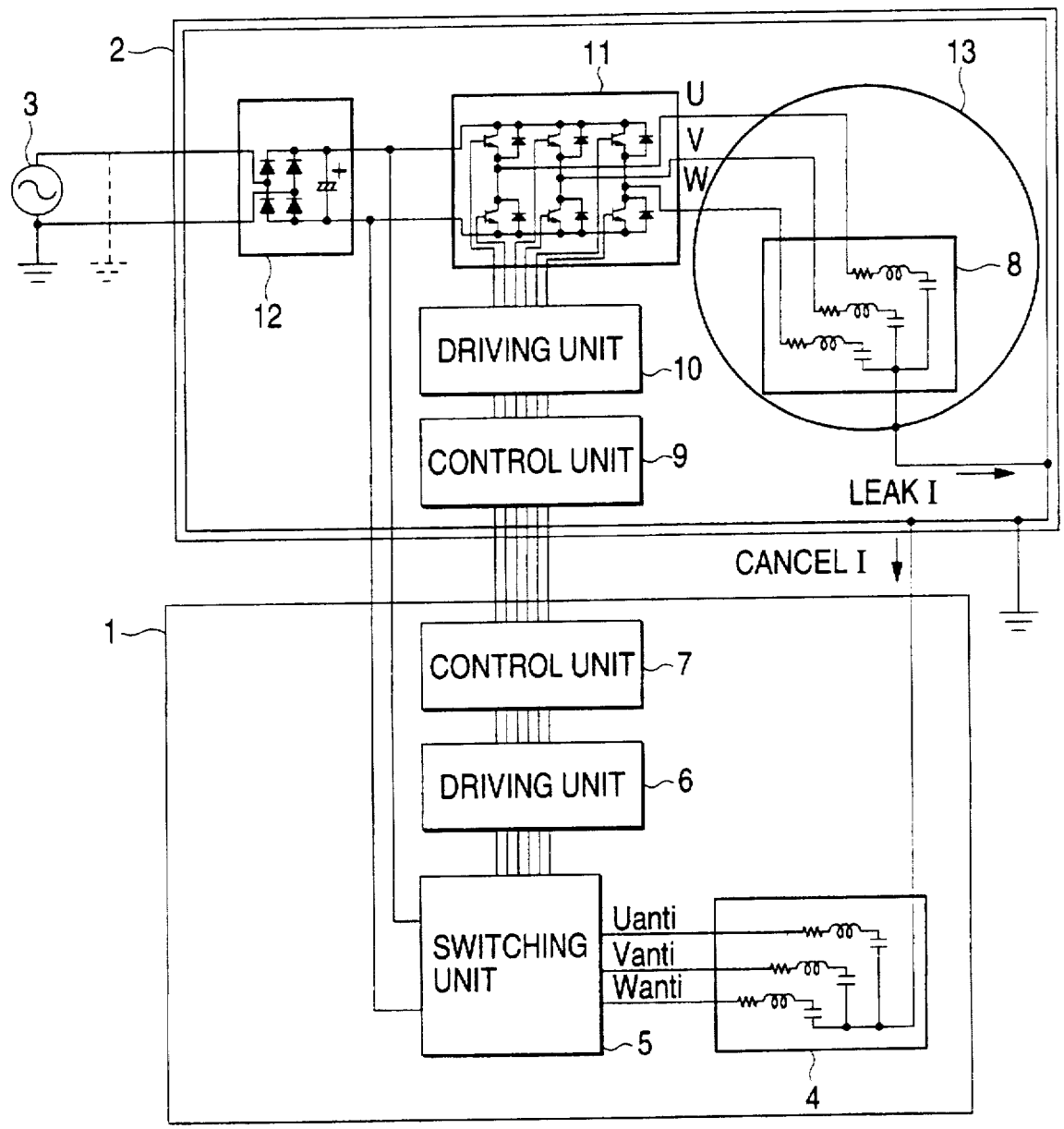
FIG. 1 is a block diagram of a leakage preventive apparatus for an inverter-driven load as Embodiment 1 of the invention.

FIG. 1 is a block diagram of a leakage preventive apparatus embodying the present invention. Reference numeral 1 denotes the configuration of a leakage preventive apparatus; 2, the constitution of a main body containing a converter-invertor unit and a motor; and 3, a commercial power supply. In the leakage preventive apparatus 1, reference numeral 4 denotes an impedance equivalent to the leakage impedance 8 of a load in the main body; 5, a switching unit for applying voltage to the impedance 4 equivalent to the load leakage impedance; 6, a driving unit for driving the switching unit 5; and 7, a control unit for generating a switching pattern. The output of the converter 12 of the main body is used as the power source of the switching unit 5 of the leakage preventive apparatus. In this embodiment of the invention, the same microprocessor is used to realize the control unit 9 of the main body and the control unit 7 in the leakage preventive apparatus, and controlled by a built-in program therein. Moreover, the driving unit 6 and the switching unit 5 are formed of electronic parts of low current capacitance (about 500 mA or lower). In this case, the arrangement above is applied to a three-phase compressor motor. Further, reference numeral 11 denotes the switching unit of the invertor which is driven by a driving unit 10 and repeats ON/OFF operation; 12, a converter for converting an alternating current from the power supply 3 to a direct current; and 13, a motor. The motor and the converter-invertor unit constitute the main body 2.

In the example of FIG. 1, the control unit and the motor are integrally incorporated in the main body 2 and an earth terminal of a casing (not shown) is earthed. The leakage current from the motor 13 is transmitted from the energized coil of the motor 13 via the core and the insulated surface to the envelope of the motor. In a case where the earth terminal of the envelope of a motor is directly earthed or in the case of a compressor, the leakage current may flow into a closed vessel to which the motor is fixed, that is, may flow from the closed vessel to the earth in the phenomenon of frame earthing. Particularly in a case where hydrofluorocarbon or hydrocarbon is used as the main component and any other kind of refrigerant medium is mixed therewith, the quantity of leakage current tends to increase and so does that of the cancel current of FIG. 1.

The leakage impedance 8 of FIG. 1 is an equivalent circuit illustrating its presence in each of the three-phase windings but not intended to mean neutral point earthing. Actually, the impedance varies with the insulating material, the manufacturing condition, the dirt and moisture sticking to the motor in operation. In addition, leakage tends to occur in a portion where the insulation of the winding is low.

Although it is preferred that the cancel current is connected to the earth line so as to let both of them cancel each other, the cancel current may needless to say be earthed anywhere.

Figure 2:
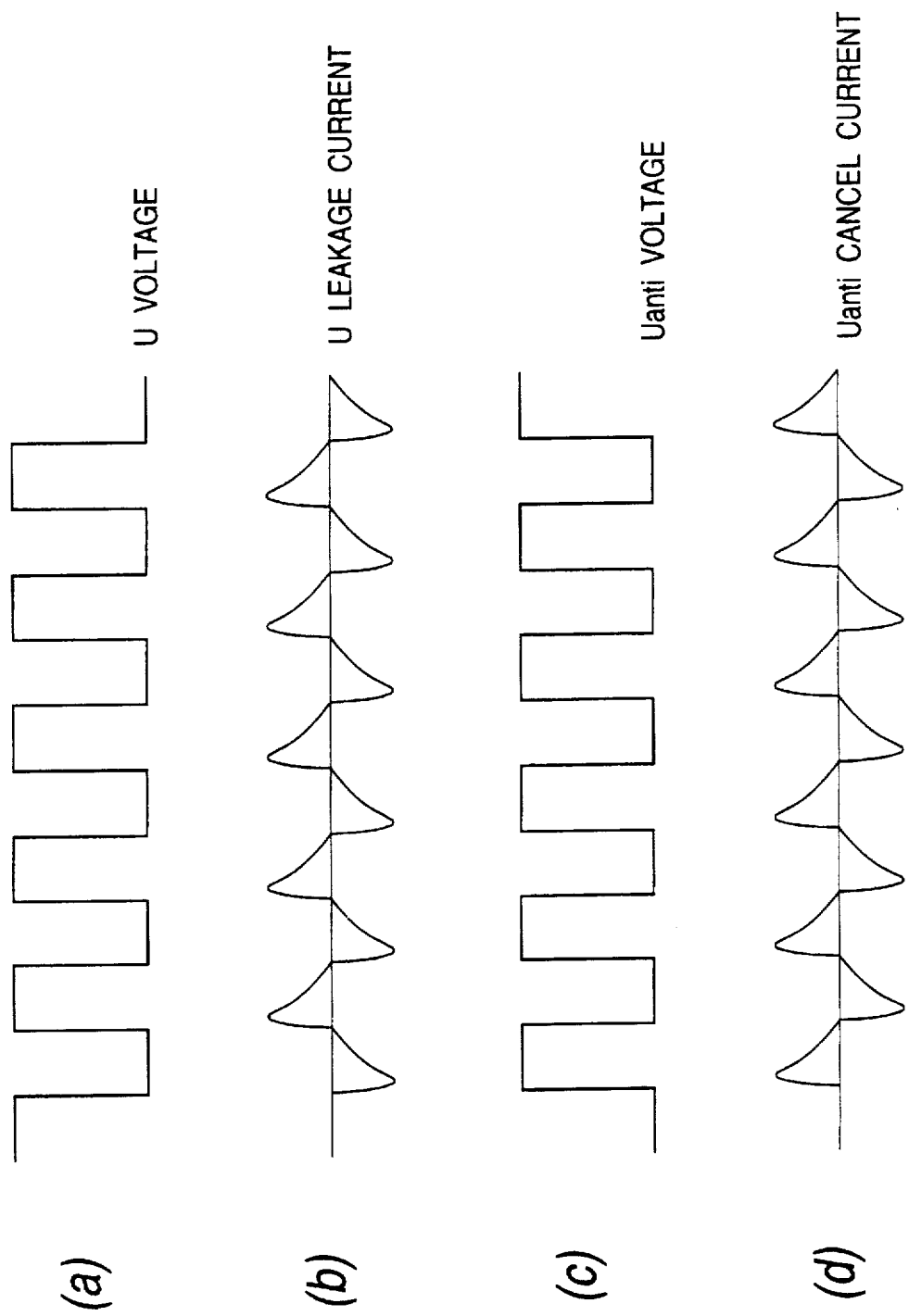
FIG. 2 is a waveform chart in respective component parts in a leakage preventive apparatus for an inverter-driven load as Embodiment 1 of the invention.

FIG. 2 shows voltage/current waveforms in respective component parts in this embodiment of the invention: (a) U-phase output voltage of the main body, that is, the voltage U between the U-phase terminal of the switching unit and the d.c. earthing; (b) leakage current originating from U-voltage variation; (c) the Uanti voltage applied to the U-phase component of the impedance 4 of the leakage preventive apparatus; and (d) cancel current originating from Uanti voltage variation. The abscissa represents a time base.

The operation of the leakage preventive apparatus in this embodiment of the invention will be described by reference to FIGS. 1, 2. In this case, reference is mainly given to the U-phase. As shown in (a), (b), the charge supplied to the capacitive component of the load leakage impedance 8 leaks when the leakage of the current from the compressor motor undergoes phase-voltage switching. In the leakage preventive apparatus shown in this embodiment of the invention, leakage is prevented through the steps of driving the switching circuit with an anti-phase voltage to the phase voltage of the main body to generate the voltage shown in (c), applying the voltage to the impedance 4 equivalent to the load leakage impedance, and preventing leakage by letting a reverse current with respect to the leakage current of the main body flow as shown in (d).

The equivalent impedance 4 is operated by applying the voltage to the windings U, V, W to let current flow, so that the load leakage impedance can be obtained by measuring the leakage current then. Further, preset parts such as resistors, coils and capacitors may be used for an equivalent impedance equal to the load leakage impedance thus obtained. The U-voltage of the main body is controlled by the control unit 9 and a switching signal is generated by the driving unit 10 to effect switching. On the other hand, a signal opposite in phase to the switching signal is generated by the driving unit 6 under the control of the control unit 7 and an anti-phase voltage is generated by the switching unit 5.

When the U-voltage of the part (a) in FIG. 2 and the Uanti voltage are individually applied to the equivalent leakage impedance, a U-leakage current is produced from the motor 13 and caused to flow toward the earth as shown by an arrow.

On the other hand, a Vanti cancel current entirely opposite in phase to the U-leakage current flows from the equivalent impedance 4 of the leakage preventive apparatus 1 as a negative current as shown by an arrow of FIG. 1 in such a manner as to deny each other.

Incidentally, the control units 9, 7 and the driving units 10, 6 are intended only to generate an inversion voltage identical to the phase voltage with respect to ON/OFF of the transistor of the impedance unit 11; in other words, they may needless to say be replaced with a simple circuit in which a signal from one control unit causes the driving unit 6 to generate an inversion current.

Moreover, the switching unit 5 and the equivalent impedance 4 are intended only to flow the leakage current and can be replaced with small capacity switching elements or parts of R, L, C so that they may be converted into an IC circuit.

Thus an inexpensive, small-sized leakage preventive apparatus is made available by adding an inversion voltage to an impedance equivalent to the leakage impedance so as to utilize software in a simple electronic component part or a microcomputer without the use of an expensive large-sized product such as a leakage preventive transformer.

Since small-capacity parts are used to form a leakage preventive apparatus, it is feasible to form the apparatus into one IC, which has heretofore been impossible to arrange. Thus such a leakage preventive apparatus can be made small-sized and inexpensive by introducing the use of an IC therein.

Embodiment 2

Figure 3:
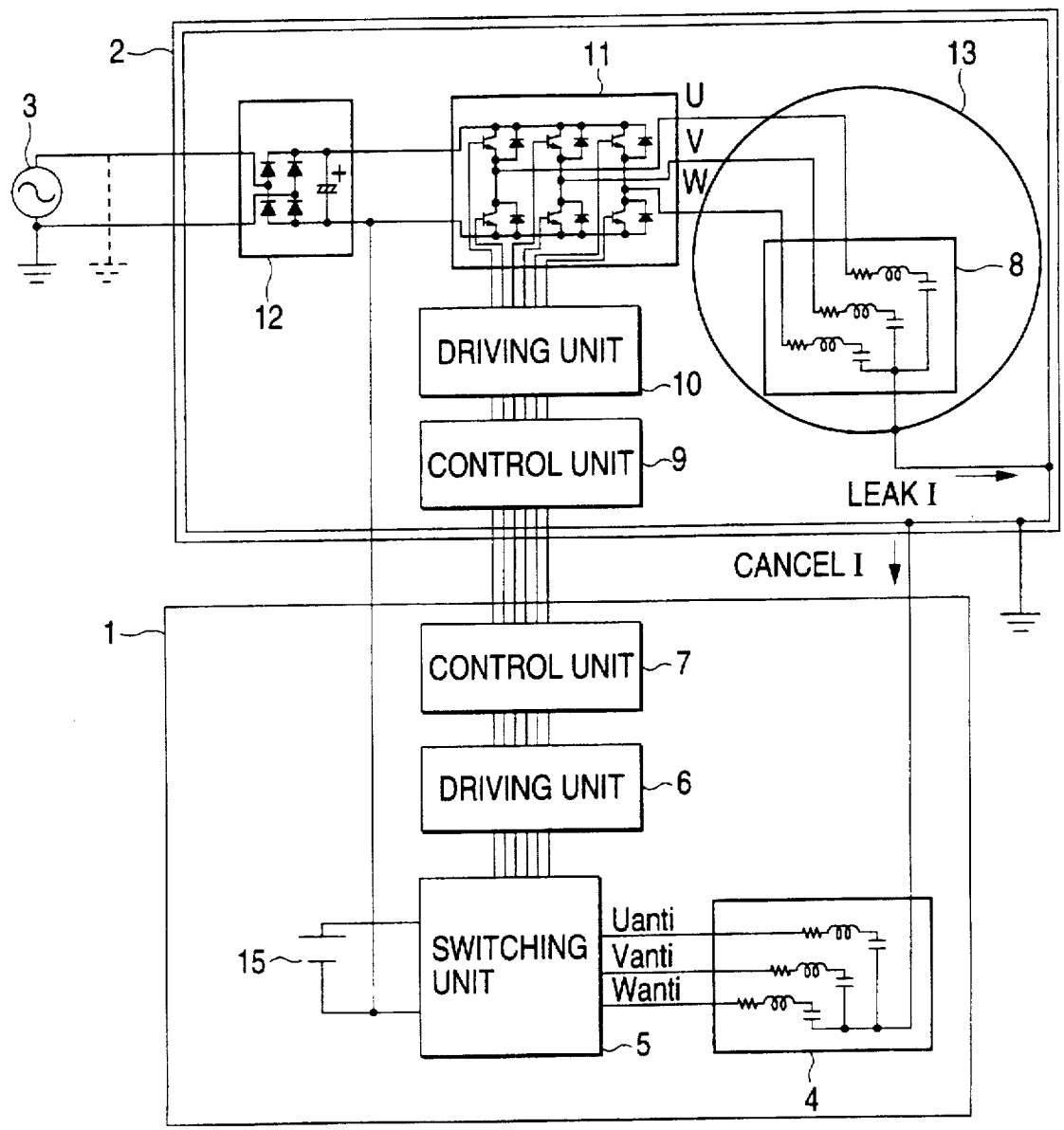
FIG. 3 is a block diagram of a leakage preventive apparatus for an inverter-driven load as Embodiment 2 of the invention.

FIG. 3 is a block diagram of another leakage preventive apparatus embodying the present invention. Reference numeral 15 denotes a constant voltage source for supplying DC voltage to the switching unit 5. Although the output of the converter 12 of the main body has been used as the voltage source of the switching unit 5 of the leakage preventive apparatus in Embodiment 1 of the invention, a DC supply source as what is separated from the main body may be used to perform the same operation. In a case where the output voltage of the converter of the main body is high, the use of another low-voltage DC power supply as the voltage source of the switching unit 5 of the leakage preventive apparatus makes it possible to use a voltage greatly lower than the output voltage of the converter, thus lowering the withstand voltage of the component elements of the switching unit 5 and the equivalent circuit parts.

Thus such a leakage preventive apparatus as this can be made small-sized and inexpensive since it is so arranged as to dispense with an expensive large component part such as a leakage preventive transformer.

Even though the setting of the equivalent impedance goes wrong or varies during long-term operation, it can simply be dealt with by varying the applied current voltage 15, so that an easy-to-handel apparatus is obtainable.

Embodiment 3

Figure 4:
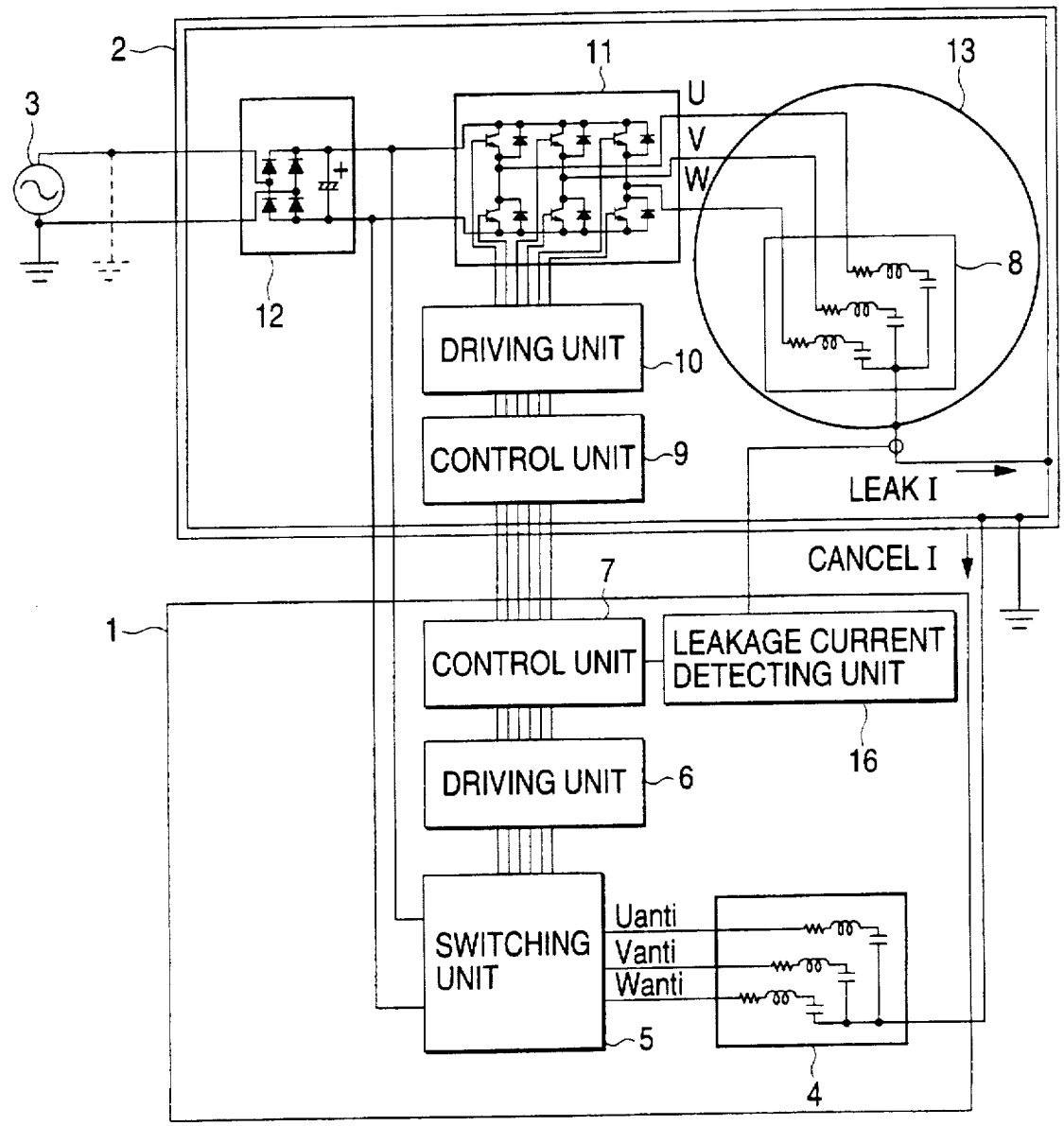
FIG. 4 is a block diagram of a leakage preventive apparatus for an inverter-driven load as Embodiment 3 of the invention.

FIG. 4 is a block diagram of still another leakage preventive apparatus embodying the present invention. Reference numeral 16 denotes a leakage current detecting unit for detecting the leakage current of the main body and outputting information concerning the leakage in order to transfer the leakage current condition to the control unit 7. Although the cancel current has been generated without taking the actual leakage current condition into consideration in Embodiments 1, 2 of the invention, the information concerning the leakage current is detected so that it is reflected on the control operation, whereby the deviation of both the leakage and cancel currents, if it occurs, can be corrected. Thus the deviation of the load leakage impedance 8 of the main body and the impedance equivalent to the load leakage impedance of the leakage preventive apparatus due to variation with time, and that of U, V, W and Uanti, Vanti, Wanti voltage variations in timing due to a time lag of each component part can be dealt with.

Figure 5:
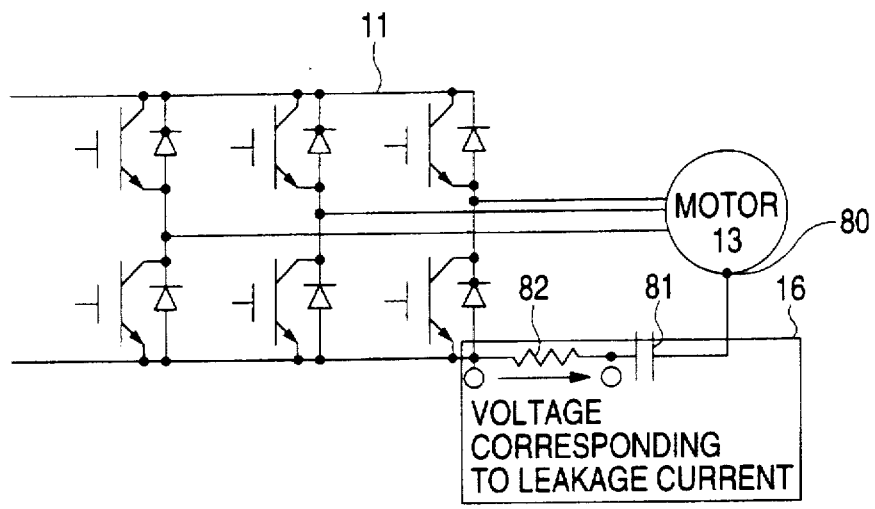
FIG. 5 is a diagram illustrating a leakage current detecting unit according to the present invention.

FIG. 5 illustrate part of the arrangement of the leakage current detecting unit. The motor frame 80 of the motor 13 and one end of the switching unit 11 are connected via a capacitor 81 and a resistor 82. The high-frequency leakage current is detected in such a state that it is passed through the capacitor 81 while almost no current is allowed to pass through the high-power resistor 82.

In other words, the method of detecting the leakage current is to detect voltage across a resistor that is inserted between the motor frame 80 and the bus of the switching unit 11, for example, the minus side thereof. This voltage is correlated to the leakage current. In order to maintain DC insulation, a capacitor is normally inserted in series, though a resistor is only needed to perform the detecting function.

For the resistor and the capacitor, a resistance value of the order of about several kilo ohms and a capacitance ranging from about several thousands to about several hundreds pF are considered suitable, respectively. In this case, the timing rather than the size of Uanti comes into question. As far as the switching voltage Uanti for the purpose of obtaining the preventive current is concerned, the same voltage waveform is produced in a short time span (with respect to the switching time) regulated by an LCR as a passive element. In view of making the current size variable in this embodiment of the invention, an attempt has been made to reduce the leakage current.

In an actual product, there exists some delay in the switching timing produced by the control unit 9 and the timing at which the voltage varies at the output of the switching unit 11. The delay of the switching unit particularly results from the nonuniformity of the element and the quantity of the output current.

According to this embodiment of the invention, the deviation can be dealt with by making the leakage current detecting unit 16 detect the information concerning the timing delay in the main body and also making the control unit 7 of the leakage preventive apparatus correct the time delay.

Therefore, the leakage preventive apparatus thus obtainable can deal with variations in not only the switching element but also the operating current. Since correction is made by the control unit in this embodiment of the invention, moreover, it is possible to deal with such correction less costly by means of the built-in software of a microprocessor in the main body.

Figure 6:
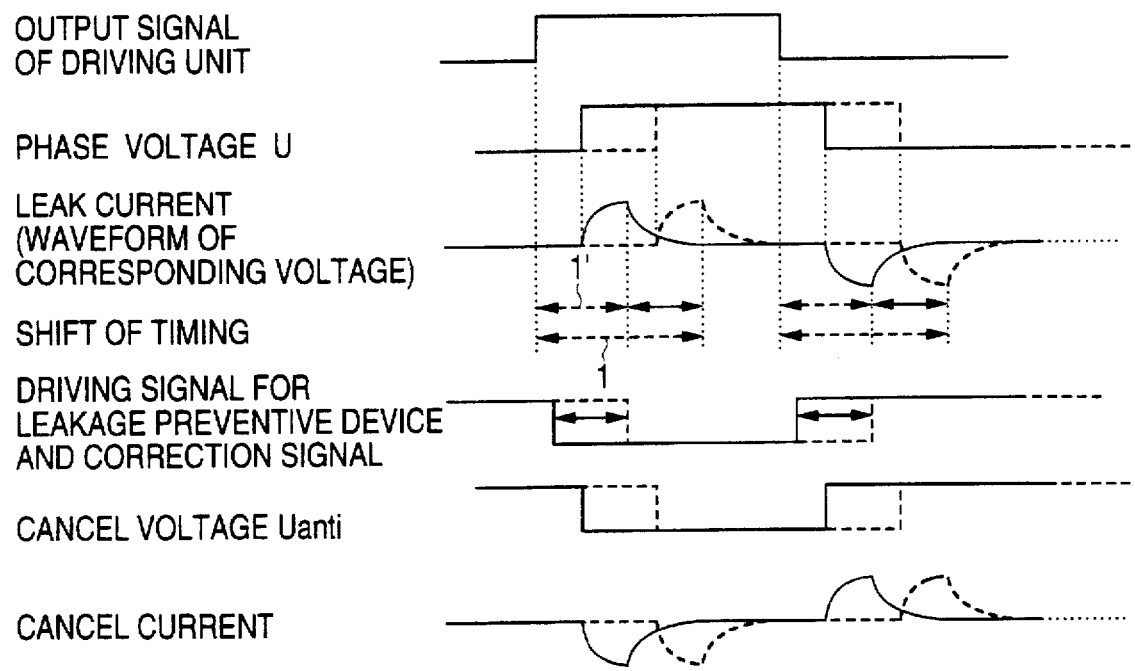
FIG. 6 is a diagram illustrating a timing chart of a driving signal and a leakage current according to the present invention.
Figure 7:
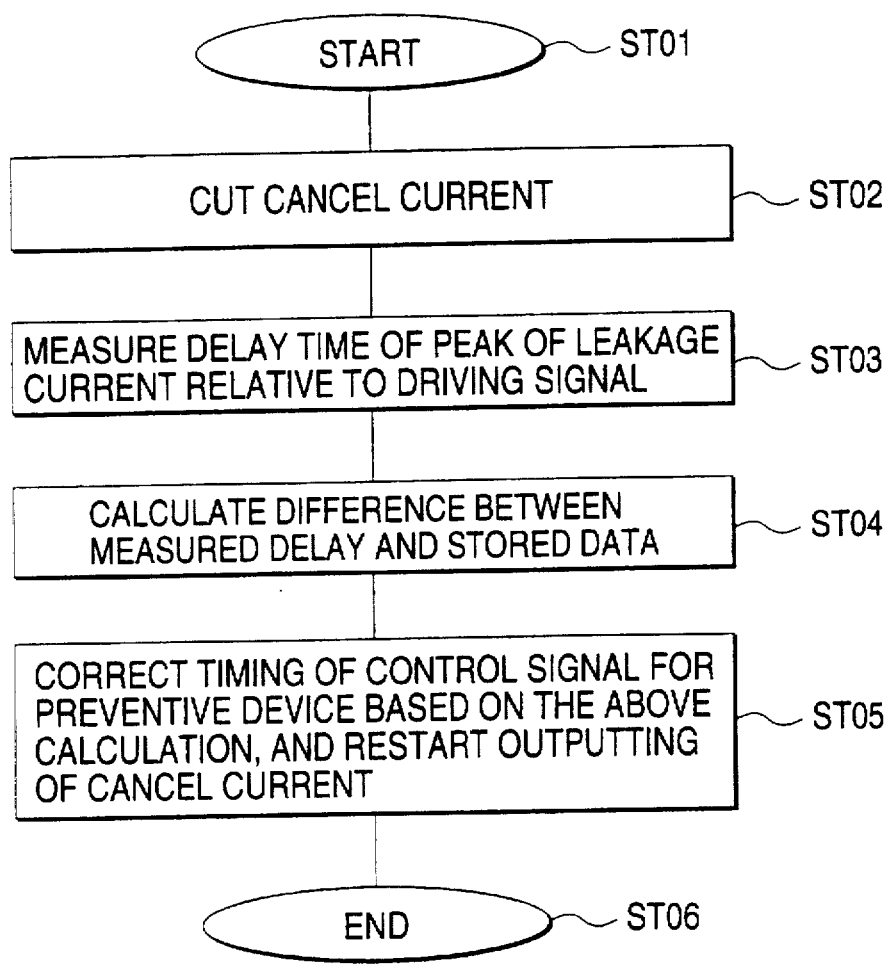
FIG. 7 is a flowchart showing signal correction according to the present invention.

FIG. 6 is a timing chart of a driving signal and a leakage current; and FIG. 7 a flowchart explanatory of the operation.

In FIG. 6, variations (shown by double headed arrows with straight lines) in the timing of the peak voltage of the voltage waveform correlated to the leakage current obtained are made correction values of timing at which the driving signal of the leakage preventive apparatus is varied. However, the cancel current has to be cut instantaneously for timing measurement. The way the correction is made includes obtaining peak delay time from the normal variation of the driving signal as a hold value, calculation the difference between the hold value and actual delay time of FIG. 6 and deviating the variable timing of the driving signal of the preventive apparatus only by the time difference. FIG. 7 is a flowchart showing the operation above. The process of FIG. 7 is performed through periodic interrupt processing.

When the control unit 7 performs a periodic interrupt processing at ST01 to perform a correcting operation in reference to FIG. 7 at ST01, the voltage added to the equivalent impedance is cut first and then the generation of the cancel current is cut (ST02). Then the voltage across the resistor 82 of the leakage current detecting unit 16 is measured to obtain ON/OFF time of the switching unit 11 and the delay time 1 of the actual leakage current (i.e., measurement voltage) (ST03).

The time 1 obtained beforehand as stored data is subtracted from the delay time 1 (ST04) in order to correct the timing of the signal generated by the driving unit 6, which is then made to produce voltage to be applied to the equivalent impedance 4 (ST05).

Then the interrupt processing is terminated (ST06).

Thus an inexpensive, small-sized leakage preventive apparatus is obtainable, which apparatus is arranged so that it is capable of correction during the operation without the use of an expensive large-sized component part such as a leakage preventive transformer and is highly reliable in view of dealing with variation with time, variations in the operating and manufacturing conditions.

Embodiment 4

Figure 8:
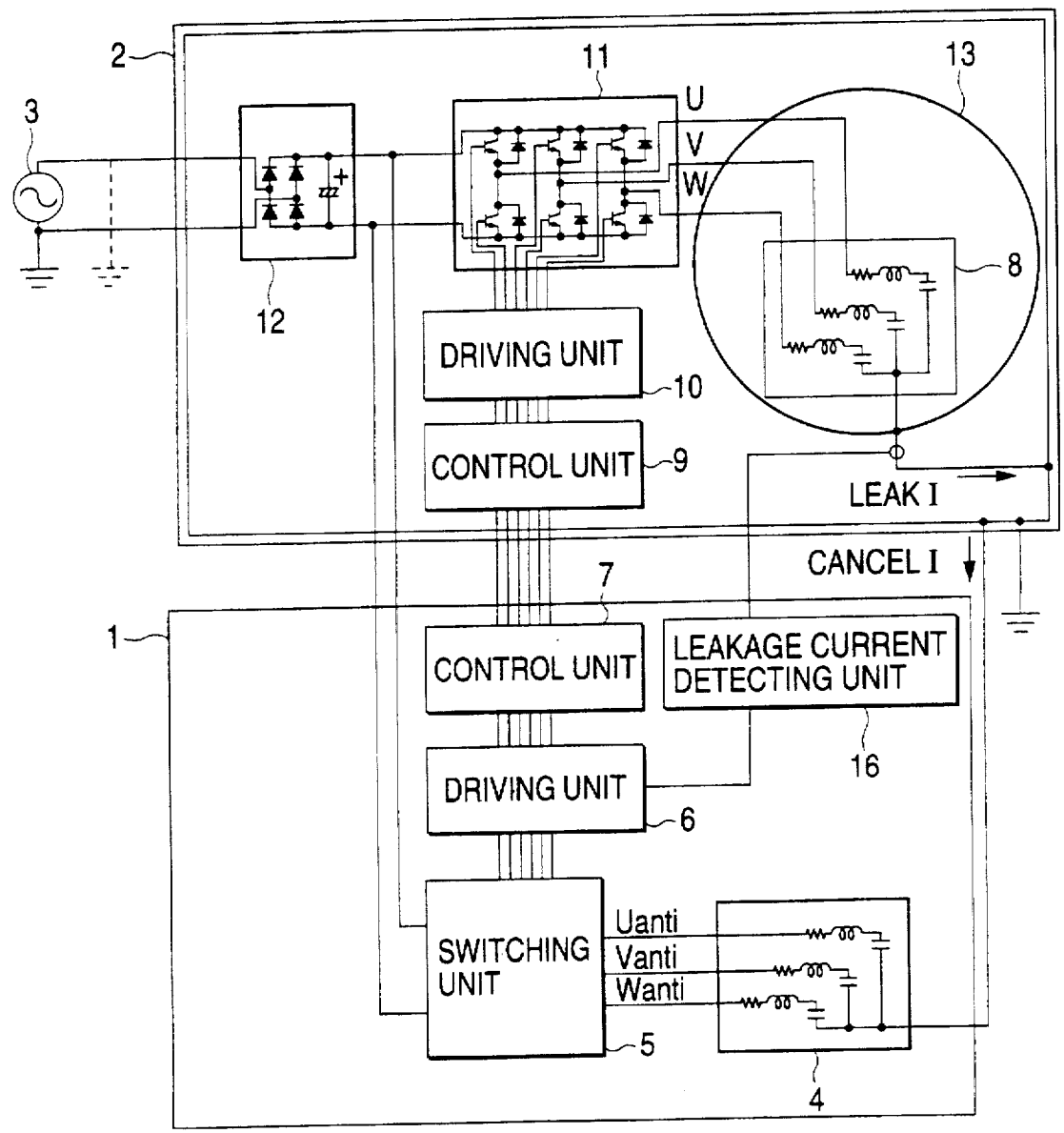
FIG. 8 is a block diagram of a leakage preventive apparatus for an inverter-driven load as Embodiment 4 of the invention.

FIG. 8 is a block diagram of still another leakage preventive apparatus embodying the present invention. Reference numeral 16 denotes the leakage current detecting unit for detecting the leakage current of the main body and outputting information concerning the leakage in order to transfer the leakage current condition to the driving unit 6. Although the cancel current has been generated without taking the actual leakage current condition into consideration in Embodiments 1, 2 of the invention, the information concerning the leakage current is detected so that it is reflected on the control operation, whereby the deviation of both the leakage and cancel currents, if it occurs, can be corrected. Thus the deviation of the load leakage impedance 8 of the main body and the impedance equivalent to the load leakage impedance of the leakage preventive apparatus due to variation with time, and that of U, V, W and Uanti, Vanti, Wanti voltage variations in timing due to a time lag of each component part can be dealt with.

In an actual product, there exists some delay in the switching timing produced by the control unit 9 and the timing at which the voltage varies at the output of the switching unit 11. The delay of the switching unit particularly results from the nonuniformity of the element and the quantity of the output current.

According to this embodiment of the invention, the deviation can be dealt with by making the leakage current detecting unit 16 detect the information concerning the timing delay in the main body and also making the control unit 6 of the leakage preventive apparatus correct the time delay.

Therefore, the leakage preventive apparatus thus obtainable can deal with variations in not only the switching element but also the operating current. Since correction is made by the driving unit in this embodiment of the invention, moreover, afterward-attachment corresponding to the existing load is made possible, whereby a general-purpose leakage preventive apparatus becomes available.

Although correction has been made by means of software, that is, the program incorporated in a microcomputer of the control unit 7 in the case of FIGS. 6 and 7, it is effected by making use of a circuit arrangement in the driving unit 6 according to this embodiment of the invention.

Figure 9:
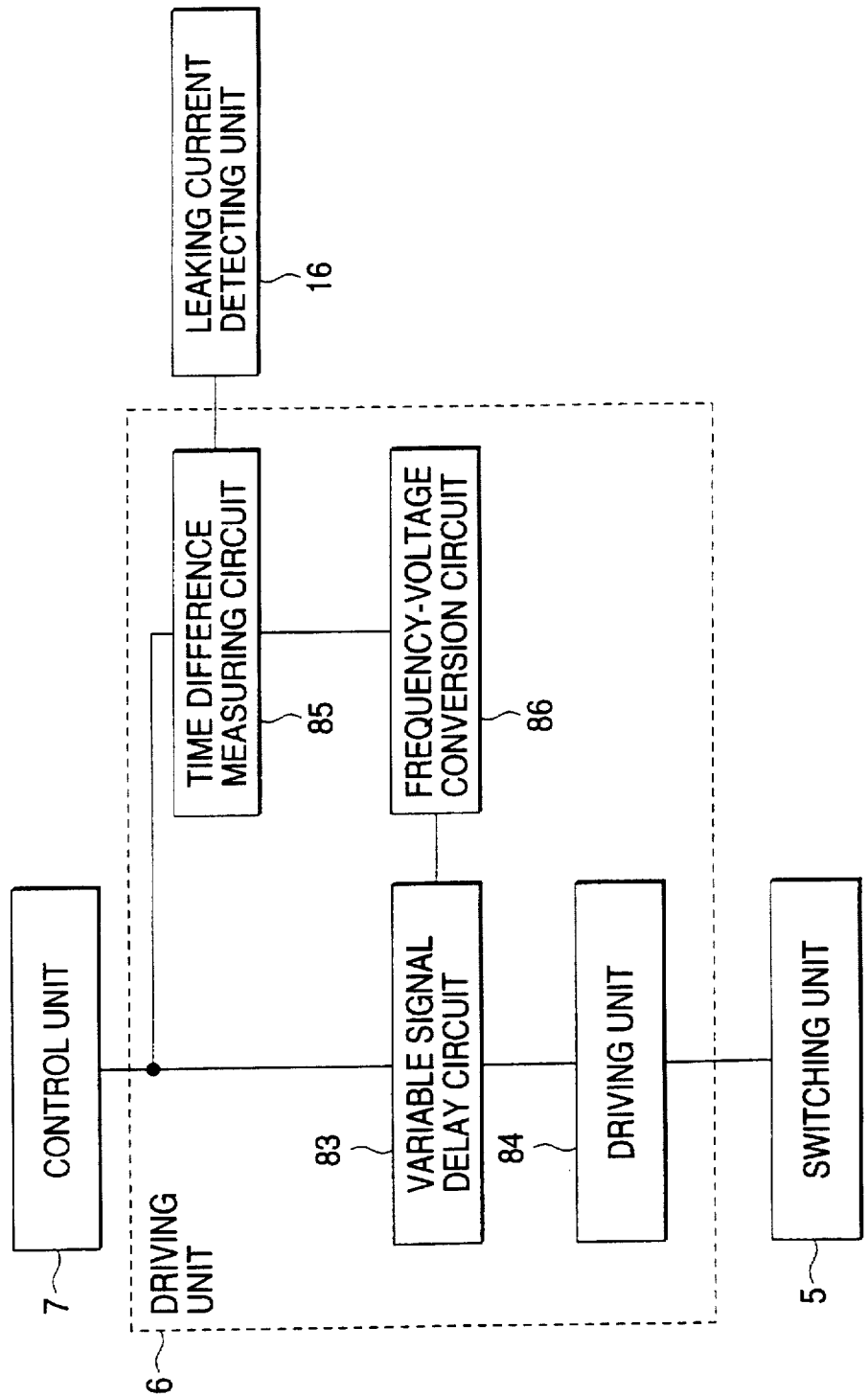
FIG. 9 is a block diagram of a correction circuit according to the present invention.

FIG. 9 shows a circuit arrangement for use in making correction.

On receiving a signal from the control unit 7, a driving circuit 84 generates a switching signal. In the meantime, a time difference measuring circuit 85 operates to measure the difference between actual time from the leakage current detecting unit and the time of a signal from the control unit 7. The time difference is converted into frequency by a frequency-voltage conversion circuit 86 and the timing intended for the switching unit 5 is corrected by a variable signal delay circuit 83. Then the driving circuit 84 is caused to generate a driving signal.

The use of software on a microcomputer is led to minimizing cost on condition that the microcomputer in the main body has a sufficient performance. In case the microcomputer has no room to spare, however, it is less costly to make the most of the circuit arrangement rather than loading another microcomputer.

Thus an inexpensive, small-sized leakage preventive apparatus is obtainable, which apparatus is arranged so that it is capable of correction during the operation without the use of an expensive large-sized component part such as a leakage preventive transformer and is highly reliable in view of dealing with variation with time, variations in the operating and manufacturing conditions.

Embodiment 5

Figure 10:
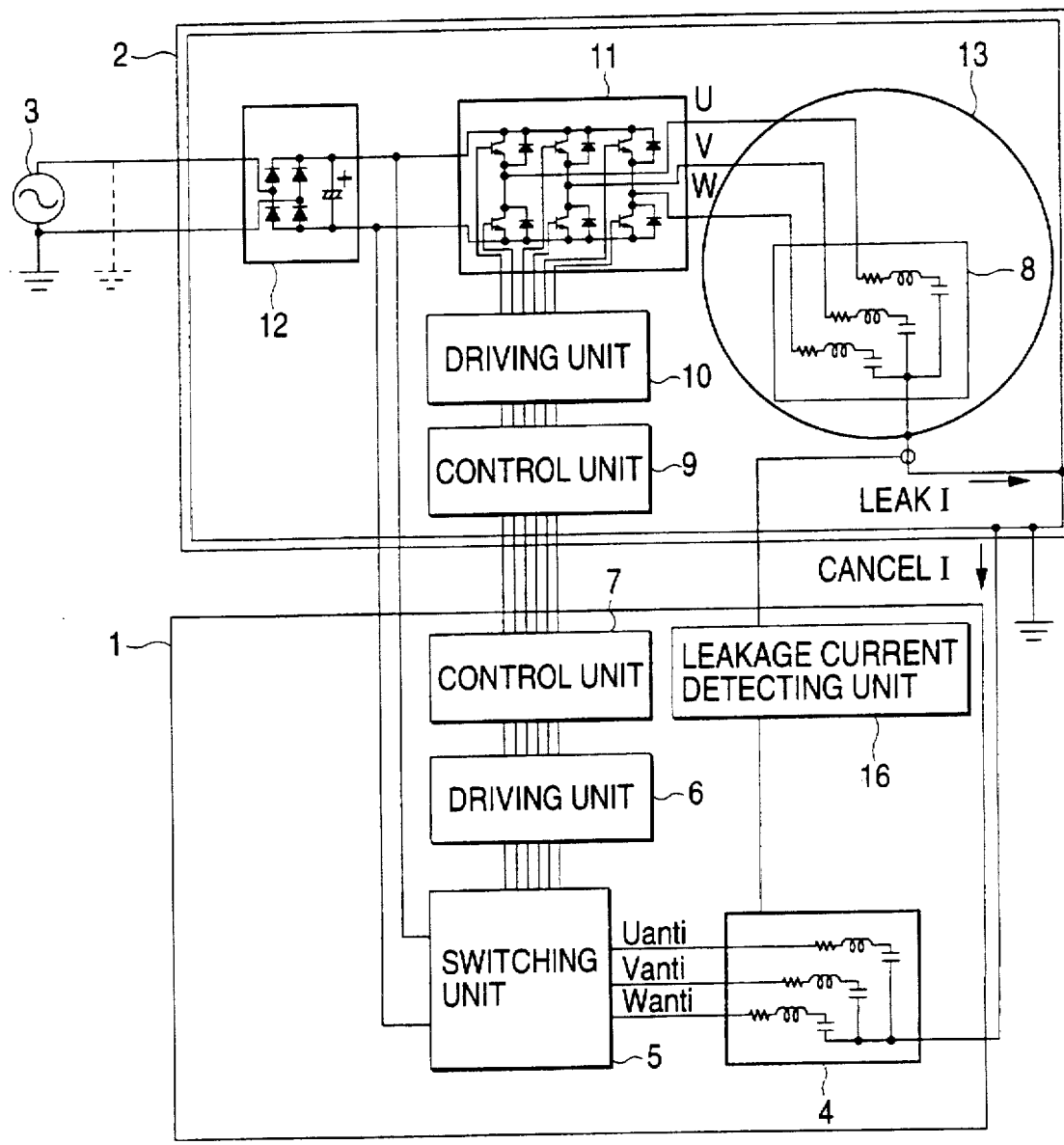
FIG. 10 is a block diagram of a leakage preventive apparatus for an inverter-driven load as Embodiment 5 of the invention.

FIG. 10 is a block diagram of still another leakage preventive apparatus embodying the present invention. Reference numeral 16 denotes the leakage current detecting unit for detecting the leakage current of the main body and outputting information concerning the leakage in order to transfer the leakage current condition to the impedance 4 equivalent to the load leakage impedance.

Although the cancel current has been generated without taking the actual leakage current condition into consideration in Embodiments 1, 2 of the invention, the information concerning the leakage current is detected and the impedance is adjusted, whereby the deviation of both the leakage and cancel currents, if it occurs, can be corrected. Thus the deviation of the load leakage impedance 8 of the main body and the impedance equivalent to the load leakage impedance of the leakage preventive apparatus due to variation with time, and that of U, V, W and Uanti, Vanti, Wanti voltage variations in timing due to a time lag of each component part can be dealt with.

Figure 11:
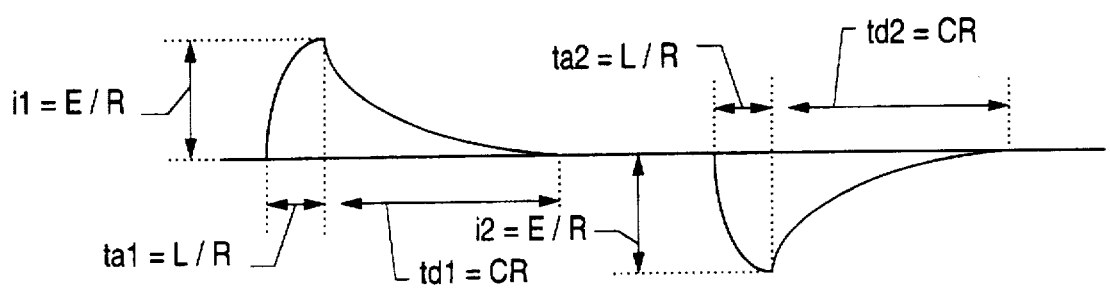
FIG. 11 is a diagram illustrating cancel current waveforms according to the present invention.

Embodiment 5 of the present invention is a modified one of Embodiments 3, 4 thereof and correction in Embodiment 5 is made by the impedance equivalent to the load leakage impedance; in other words, Embodiment 5 features that the whole waveform of the cancel current is corrected when the correction is made. With the use of a series circuit of LCR for the equivalent impedance unit, the cancel current is roughly expressed by equations as shown in FIG. 11.

Figure 12:
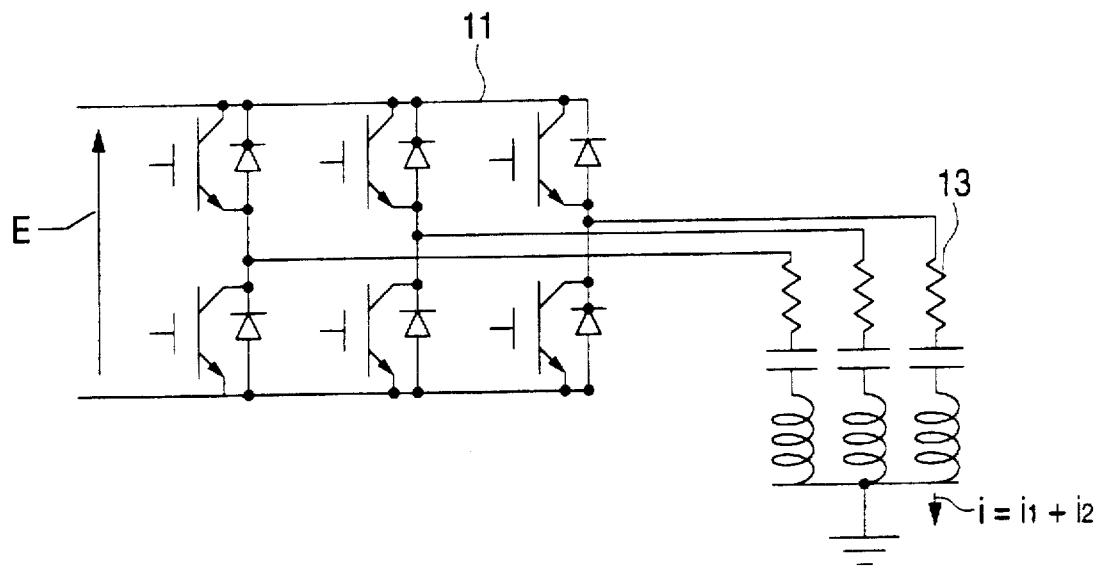
FIG. 12 is a diagram illustrating a leakage current according to the present invention.

FIG. 12 shows the relationship between the leakage impedance and the leakage current.

Each value of LCR of the equivalent impedance 4 in FIG. 10 can be made variable by providing a tap for each element so as to switch circuits from the respective taps by means of the switching element.

Figure 13:
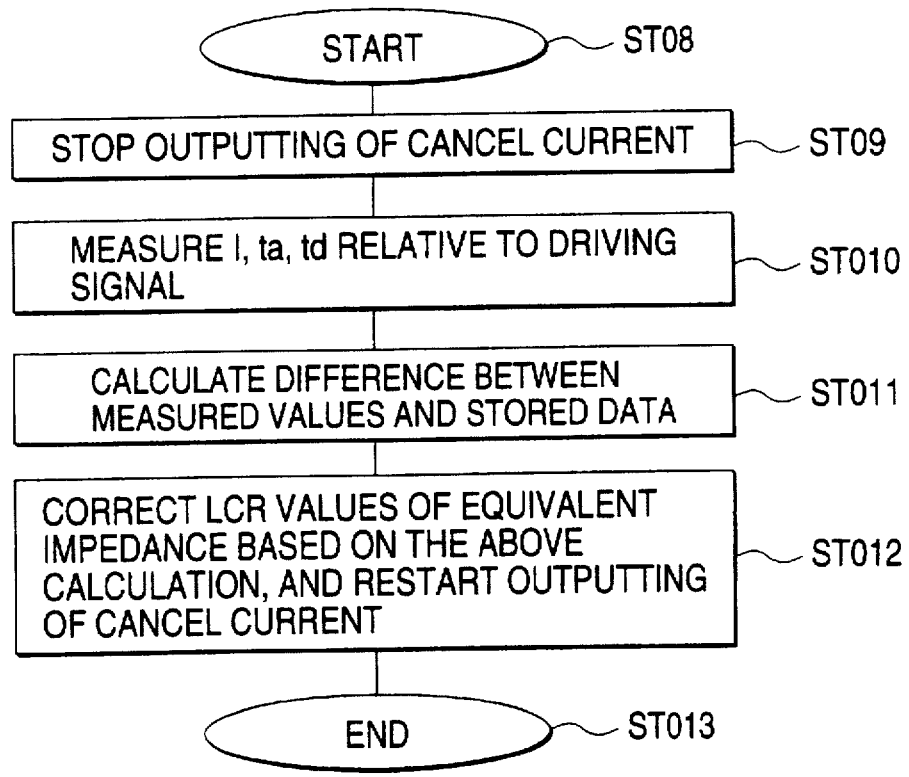
FIG. 13 is a flowchart showing algorithm concerning correction according to the present invention.

An algorithm concerning the correction will be described by reference to a flowchart of FIG. 13.

The output of the cancel current is stopped (ST09) through the interrupt process (ST08) and a voltage E and currents i1, i2 are measured and besides time ta, td are measured (ST10). A difference from the original value is calculated (ST11) and the LCR value of the equivalent impedance is corrected to the LCR value mentioned in each equation of FIG. 11 (ST12).

In an actual product, a load leakage impedance varies with the condition of a refrigerant medium within a compressor and the quantity of leakage from the compressor also varies. In an actual air-conditioner and the like, the leakage quantity at the time of starting is large and by monitoring the leakage quantity of the compressor, the impedance 4 is made variable and the impedance is lowered and the cancel current is increased when the leakage current is large, whereas the cancel current is decreased when the leakage current is small.

A high-performance leakage preventive apparatus corresponding to the variation of the operating condition of a load is obtainable.

Thus an inexpensive, small-sized leakage preventive apparatus is obtainable, which apparatus is arranged so that it is capable of correction during the operation without the use of an expensive large-sized component part such as a leakage preventive transformer, and highly reliable in view of dealing with variation with time, in the operating and manufacturing conditions.

Embodiment 6

Figure 14:
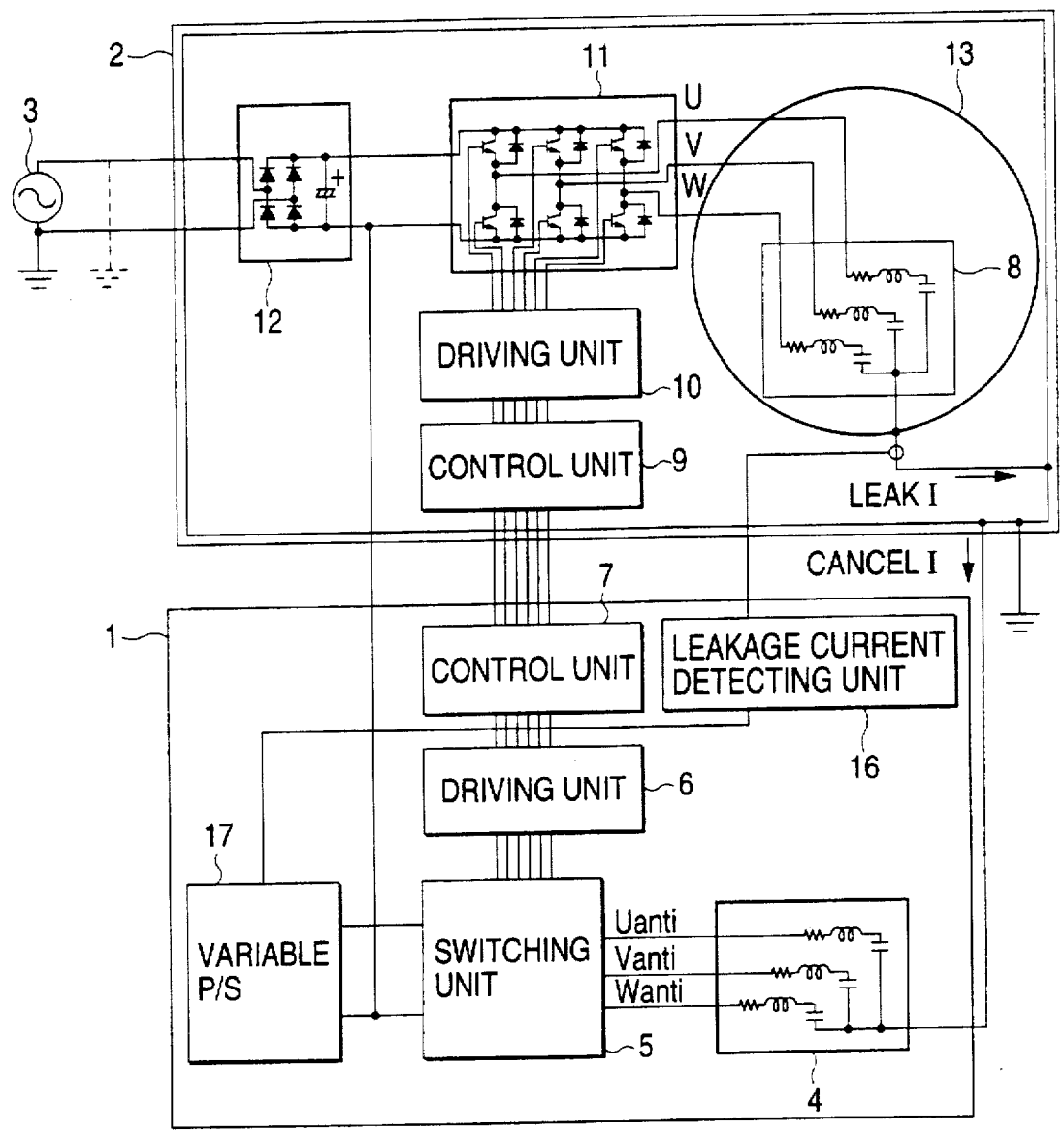
FIG. 14 is a block diagram of a leakage preventive apparatus for an inverter-driven load as Embodiment 6 of the invention.

FIG. 14 is a block diagram of still another leakage preventive apparatus embodying the present invention. Reference numeral 17 denotes a variable voltage source for supplying DC voltage to the switching unit 5; and 16, the leakage current detecting unit for detecting the leakage current of the main body and outputting information concerning the leakage in order to transfer the leakage current condition to the variable voltage source. Although the cancel current has been generated without taking the actual leakage current condition into consideration in Embodiments 1, 2 of the invention, the information concerning the leakage current is detected so that it is reflected on the source voltage, whereby the deviation of both the leakage and cancel currents, if it occurs, can be corrected. Thus the deviation of the load leakage impedance 8 of the main body and the impedance equivalent to the load leakage impedance of the leakage preventive apparatus due to variation with time can be dealt with.

This arrangement is intended to make the applied voltage variable with LCR as being constant in contrast with the example of FIG. 11 in which the LCR is set variable.

In an actual product, a load leakage impedance varies with the condition of a refrigerant medium within a compressor and the quantity of leakage from the compressor also varies. In an actual air-conditioner and the like, the leakage quantity at the time of starting is large and by monitoring the leakage quantity of the compressor, the voltage of the variable voltage source 17 is made variable and the voltage is raised and the cancel current is increased when the leakage current is large, whereas the voltage is lowered and the cancel current is decreased when the leakage current is small.

A high-performance leakage preventive apparatus corresponding to the variation of the operating condition of a load is obtainable.

Figure 15:
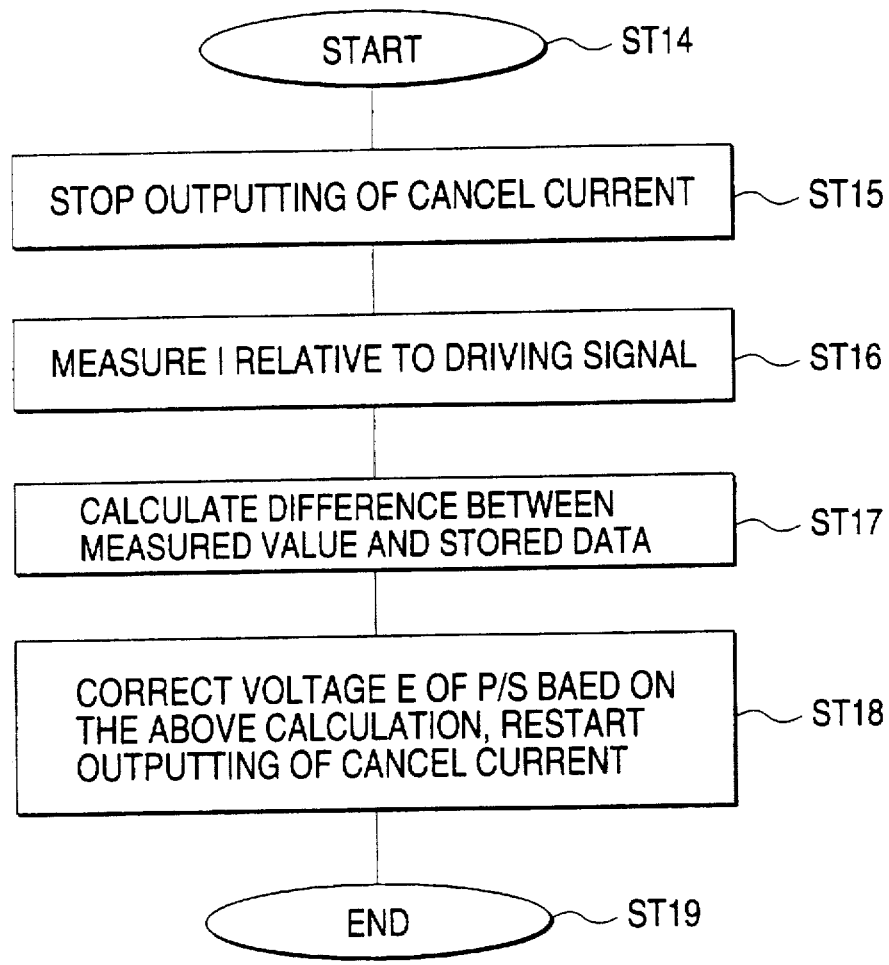
FIG. 15 is a flowchart showing algorithm concerning correction according to the present invention.

An algorithm concerning the correction of making the voltage variable will be described by reference to a flowchart of FIG. 15. What makes FIG. 15 different from FIG. 13 is that it is only needed to measure the leakage current (ST16) to correct the cancel current. Thus the difference between the measured value and the original one can be calculated (ST17) because resistance R is constant. Therefore, the value of the voltage applied to the equivalent impedance 4 is corrected (ST18) and the cancel current of the leakage current is output after the interrupt process is terminated.

Thus an inexpensive, small-sized leakage preventive apparatus is obtainable, which apparatus is arranged so that it is capable of correcting the cancel current without the use of an expensive large-sized component part such as a leakage preventive transformer and is highly reliable in view of dealing with variation with time, variations in the operating and manufacturing conditions.

Embodiment 7

Figure 16:
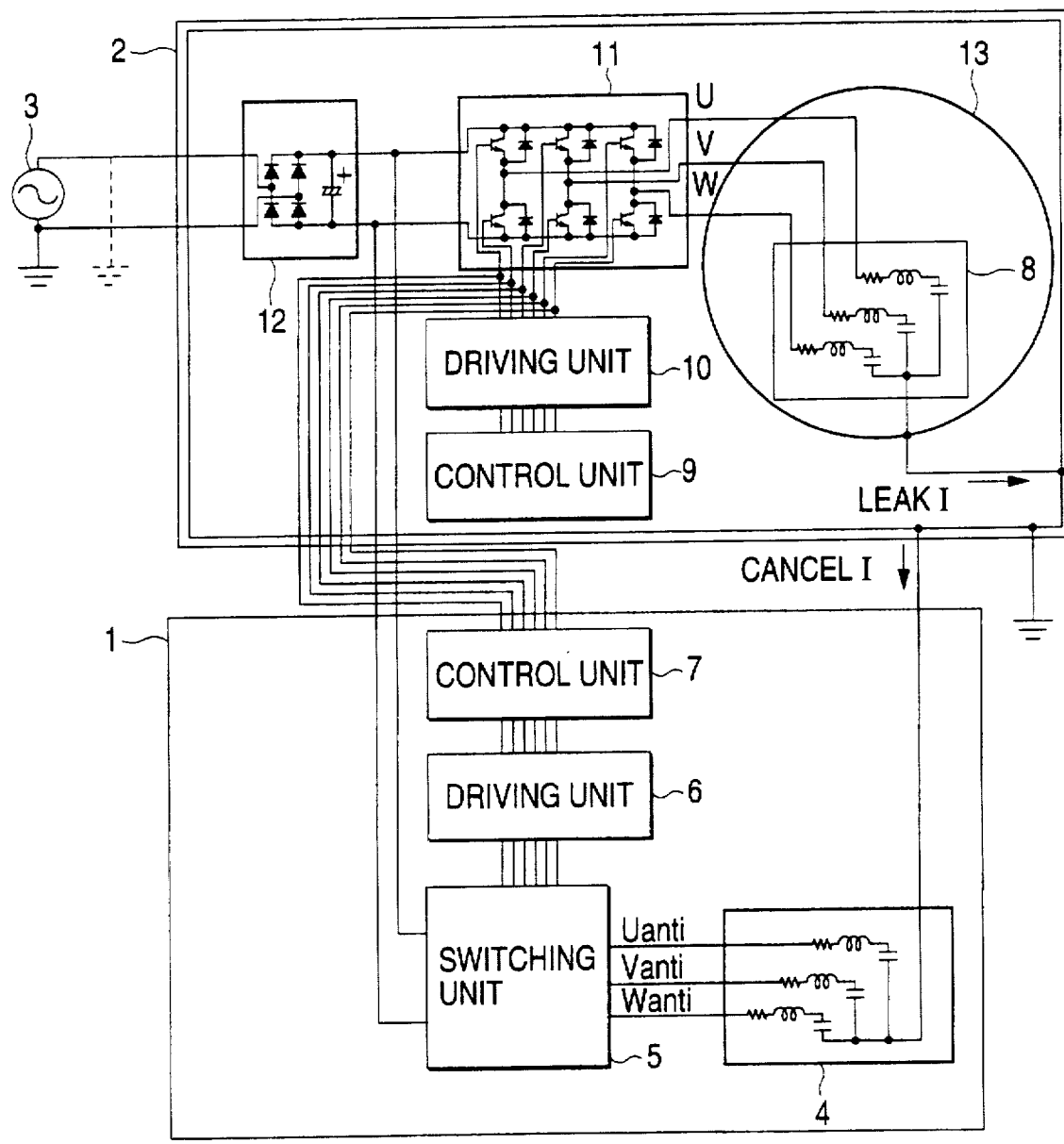
FIG. 16 is a block diagram of a leakage preventive apparatus for an inverter-driven load as Embodiment 7 of the invention.

FIG. 16 is a block diagram of still another leakage preventive apparatus embodying the present invention. Although the driving information has been offered to the leakage preventive apparatus within the same microprocessor in Embodiments 1 through 6, the same operation may be performed by retrieving the driving information from the driving unit 10 in the main body to the control unit 7 formed with a logical circuit to generate the switching pattern of the leakage preventive apparatus. With this arrangement, the leakage preventive apparatus can be attached to an existing main body afterward.

Thus an inexpensive, small-sized leakage preventive apparatus is obtainable, which apparatus is arranged without the use of an expensive large-sized component part such as a leakage preventive transformer. Moreover, such a leakage preventive apparatus is attachable to an existing main body afterward in order to reduce the leakage current of the existing apparatus; in other words, it is a leakage preventive apparatus exceedingly fit for general purpose because it is compact and simply attachable afterward.

Figure 17:
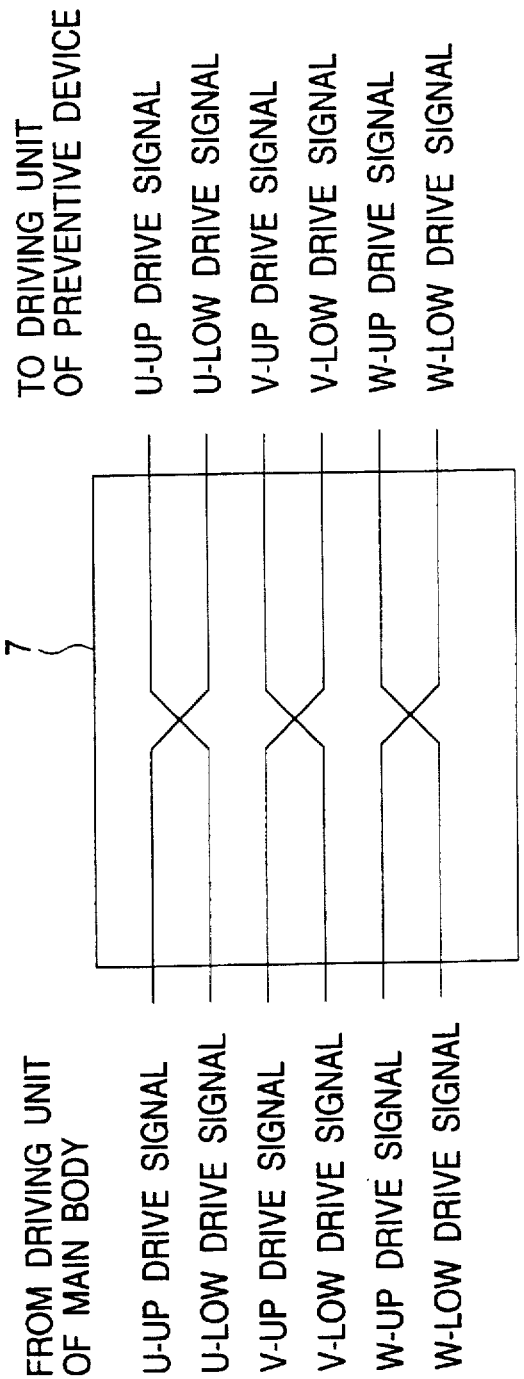
FIG. 17 is a diagram illustrating cross connections according to the present invention.

FIG. 17 is a diagram illustrating the afterward-attachment above only with connections. More specifically, cross connections may be used to reverse the ON/OFF signal directed to the driving unit 6 of the leakage preventive apparatus 1 with respect to output wiring from the driving unit 10 of the main body.

Embodiment 7 of the invention is a modified one and the difference lies in the fact that where information concerning switching in the main body, that is, where information concerning the timing of variation of the phase voltage in the main body is obtained from.

The operation of the control unit is normally based on software within the microcomputer. The driving unit is formed with a low-voltage electronic circuit and the switching unit with a high-voltage electronic circuit. Minimum information necessary for the preventive apparatus according to the present invention is ultimately information on the variation of the output phase voltage in the main body. In view of cost for the acquisition of the information, Embodiment 7 is relatively advantageous in order of advantage; however, its position in order of advantage is reversed from the standpoint of accuracy of information because a time lag appears in each component part. The measure taken to provide the cross connections makes available a free, highly-flexible leakage preventive means since the leakage preventive apparatus is additionally attachable to any equipment afterward so as to solve the problem above.

Embodiment 8

Figure 18:
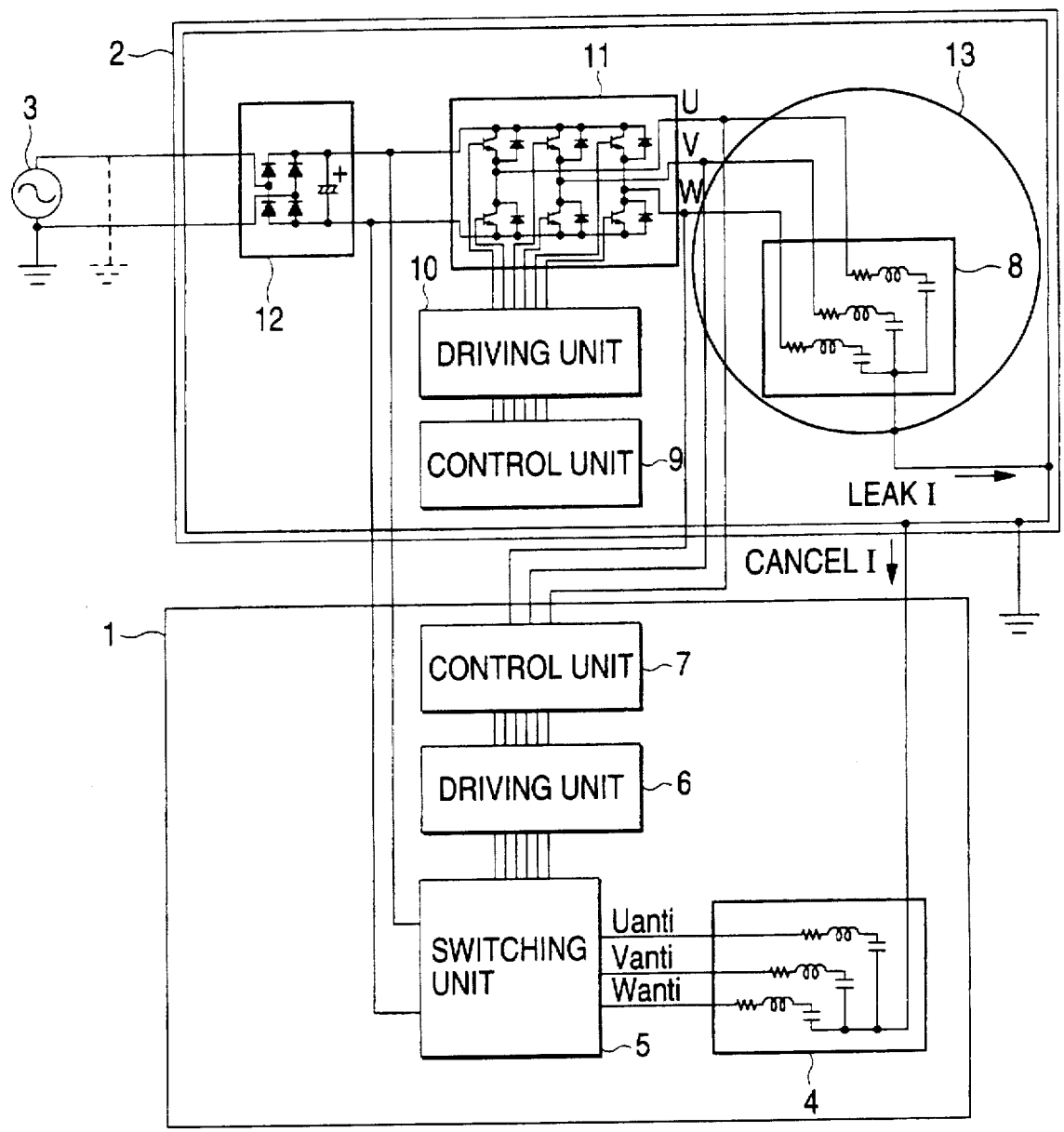
FIG. 18 is a block diagram of a leakage preventive apparatus for an inverter-driven load as Embodiment 8 of the invention.

FIG. 18 is a block diagram of still another leakage preventive apparatus embodying the present invention. Although the driving information has been offered to the leakage preventive apparatus within the same microprocessor in Embodiments 1 through 6, the same operation may be performed by retrieving the driving information from the switching unit 11 in the main body to the control unit 7 to generate the switching pattern of the leakage preventive apparatus.

Thus an inexpensive, small-sized leakage preventive apparatus is obtainable, which apparatus is arranged without the use of an expensive large-sized component part such as a leakage preventive transformer. Since such a leakage preventive apparatus is attachable to an existing main body afterward, moreover, it is exceedingly fit for general purpose.

Figure 19:
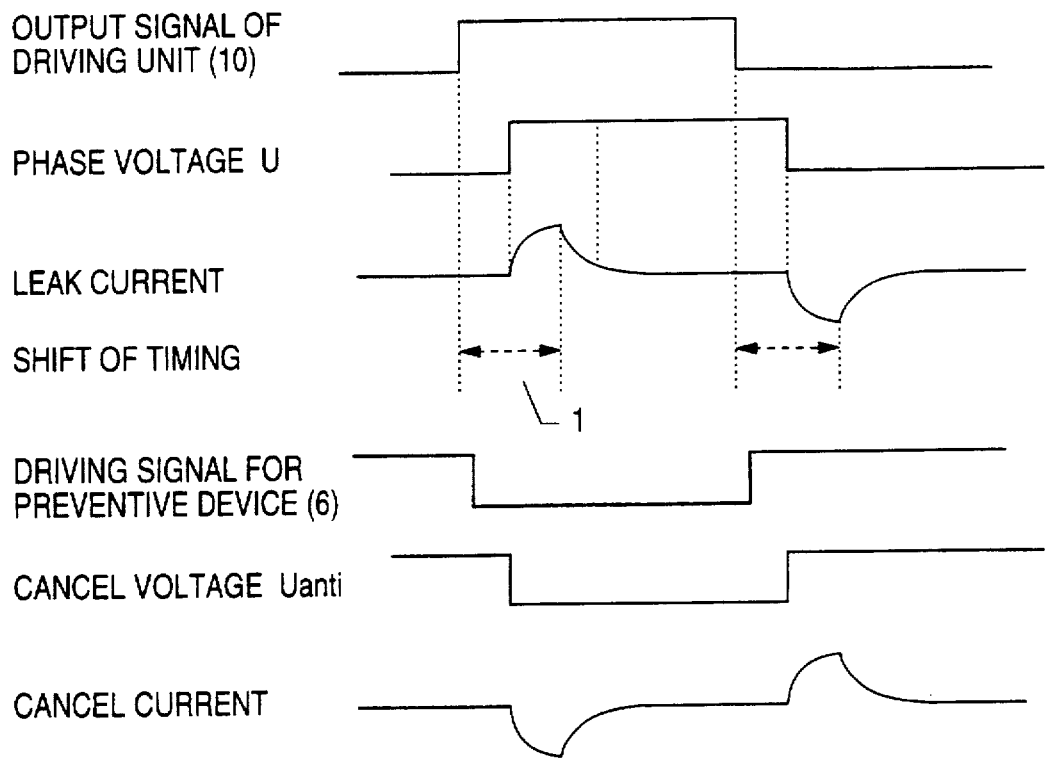
FIG. 19 is a timing chart illustrating information and an output according to the present invention.

FIG. 19 is a timing chart concerning information and outputs of a driving signal, a phase voltage and a leakage current.

As shown in FIG. 19, the rising and falling timing of the phase voltage is detected and directly used to set the timing of the leakage preventive apparatus by means of the control unit, so that the inverted phase voltage may be generated as a cancel voltage Uanti.

Although processing free from a time lag is required for each component part of the preventive apparatus, faithful timing is possible even when the characteristics of the driving unit and the control unit in the main body are left unknown. Thus, a general-purpose preventive apparatus is applicable to any one of the inverter applications sold in the market.

Embodiment 9

Figure 20:
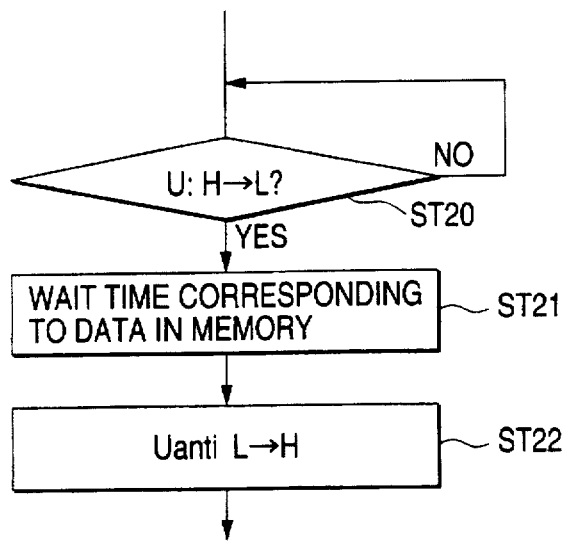
FIG. 20 is a flowchart for the control unit of a leakage preventive apparatus as Embodiment 9 of the invention.

According to this embodiment of the invention, a delay means is added to the control unit 7 in Embodiment 1 thereof. FIG. 20 is a flowchart showing the arrangement of the steps of controlling the U-phase of the control unit 7 implemented by a microprocessor in this embodiment of the invention. In reference to the detection of the variation of the U-phase voltage of the control unit 9 of the main body (ST20), the delay time made variable by software is added (ST21) and an instruction as to varying the phase voltage of the leakage preventive apparatus is output (ST22), whereby the time lags of the main body and each of the component parts of the leakage preventive apparatus are unmatched so as to eliminate timing deviation.

Thus an inexpensive, small-sized leakage preventive apparatus is obtainable, which apparatus is arranged without the use of an expensive large-sized component part such as a leakage preventive transformer. The leakage preventive apparatus thus obtained is highly reliable in view of dealing with variation with time, variations in the operating and manufacturing conditions without timing deviation due to the difference in time lag between component parts. The leakage preventive apparatus thus obtained is also superior in information accuracy to what is obtained in Embodiment 1.

Embodiment 10

Figure 21:
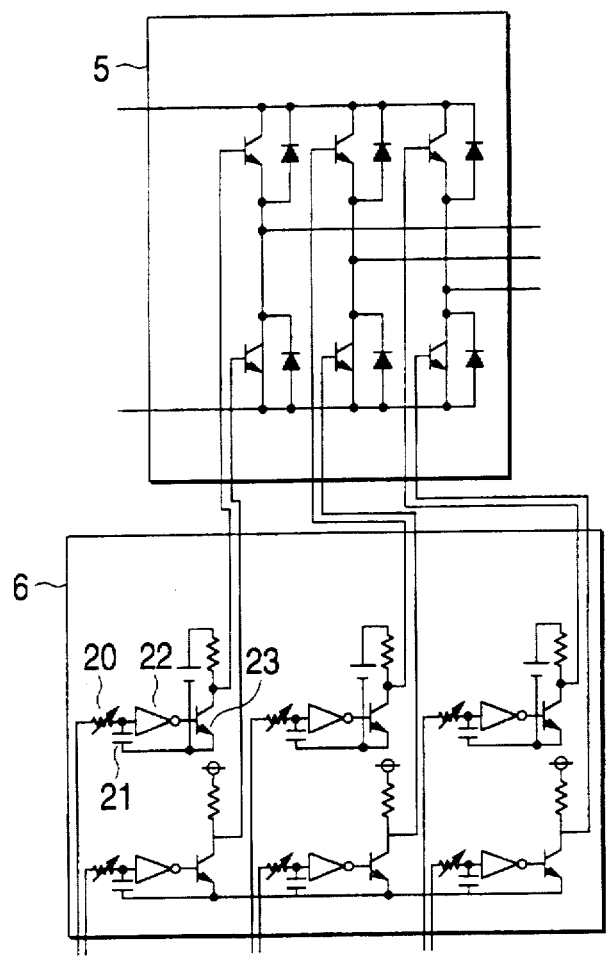
FIG. 21 is a circuit diagram of a driving unit and a switching unit of a leakage preventive apparatus as Embodiment 10 of the invention.
Figure 22:
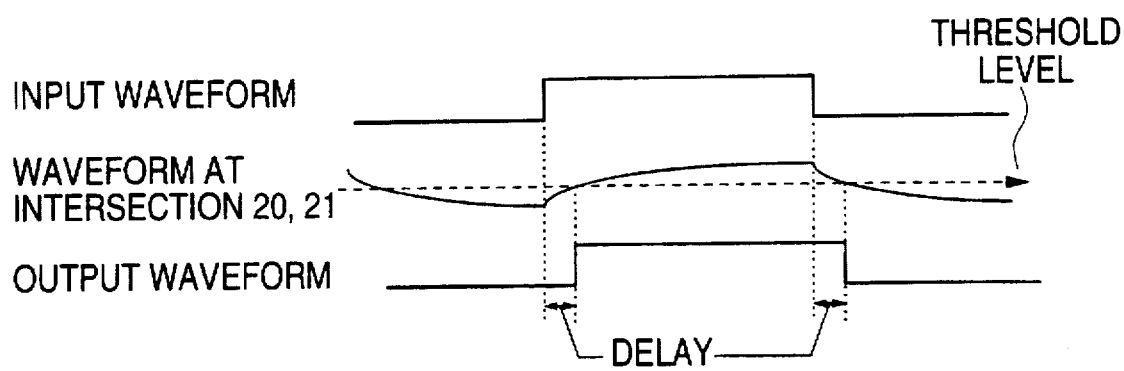
FIG. 22 is a diagram illustrating delay time according to the present invention.

According to this embodiment of the invention, a delay means is added to the driving unit 6 in Embodiment 1 thereof. FIG. 21 is a circuit diagram in reference to the driving unit 6 and the switching unit 5 in this embodiment of the invention. Reference numeral 20 denotes a variable resistor, which may be what controls a resistance value; 21, a capacitor; 22, an inverted circuit; and 23, a transistor for driving a power transistor in the switching unit. The driving unit can drive the switching unit with the value of the variable resistance 20 by adding any desired time lag. With the provision of the adjustable delay means, the time lags of the main body and each of the component parts of the leakage preventive apparatus are unmatched so as to eliminate timing deviation. FIG. 22 is a chart illustrating delay time. The delay time is determined by a threshold level 22 as a waveform at the intersection of 20, 21.

Thus an inexpensive, small-sized leakage preventive apparatus is obtainable, which apparatus is arranged with a simple circuit configuration without the use of an expensive large-sized component part such as a leakage preventive transformer. The leakage preventive apparatus thus obtained is highly reliable in view of dealing with variation with time, variations in the operating and manufacturing conditions without timing deviation due to the difference in time lag between component parts.

Embodiment 11

Figure 23A:
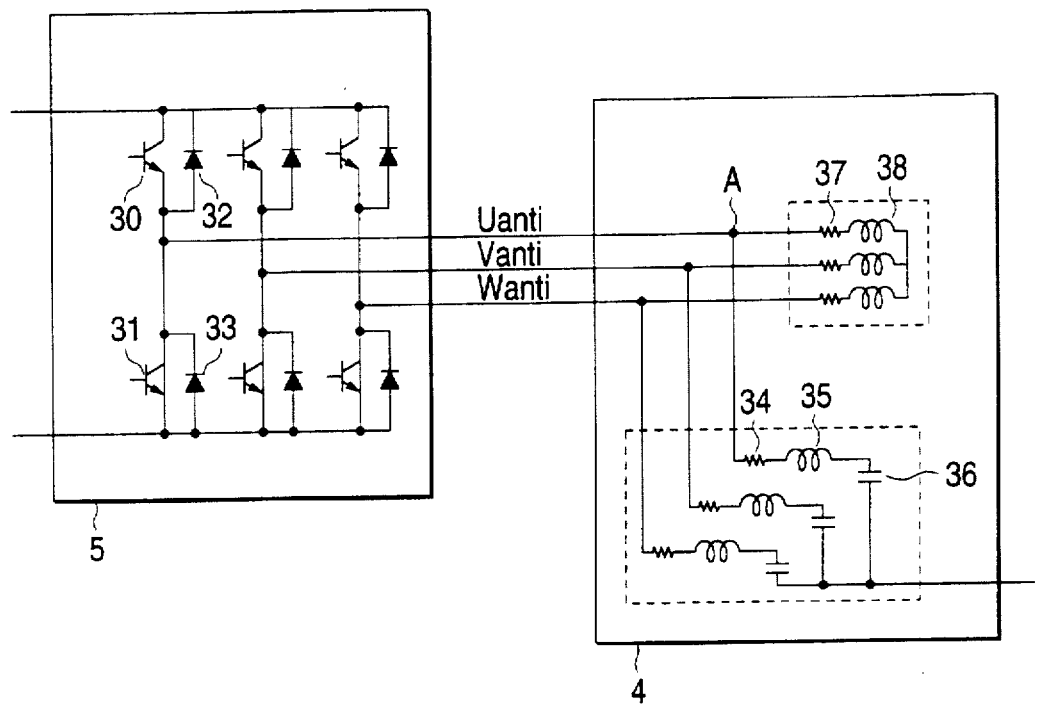
FIG. 23A is a diagram illustrating the operation of a switching unit.

FIG. 23(a) shows circuits of the switching unit and the impedance unit equivalent to the leakage impedance of the main body in the leakage preventive apparatus as an embodiment of the present invention. Reference numerals 34, 37 denote resistors; 35, 38 coils; and 36, a capacitor. According to this embodiment of the invention, 37 and 38 as additional impedances are added to the impedance 4 equivalent to the load leakage impedance in Embodiments 1 through 10, whereby Uanti, Vanti and Wanti voltages are made closer to the anti-phase voltages of the phase voltages U, V, W of a compressor.

Thus the leakage current preventive effect becomes greater than those set forth in Embodiments 1 through 10.

More specifically, the additional impedances 37, 38 do not refer to a leakage impedance with respect to a neutral point where the respective phases are brought together but those equivalent to the impedance of the preset load itself. On the other hand, the current as the cancel current flows into the main body only when the phase voltage of the switching unit 5 rises or falls because of the presence of the capacitor 36 in the impedances 34, 35, 36 equivalent to the leakage current. Due to the additional impedances, it is possible to flow the current corresponding to the equivalent impedance 4 at all times. Consequently, the preventive apparatus 1 capable of generating a voltage which is equal to and inverted from the phase voltage flowing through the motor 13. The additional impedances 37, 38 are those equivalent to the main body, whereas the impedances 34, 35, 36 refer to an LCR circuit for flowing a transient current.

Figure 23B:
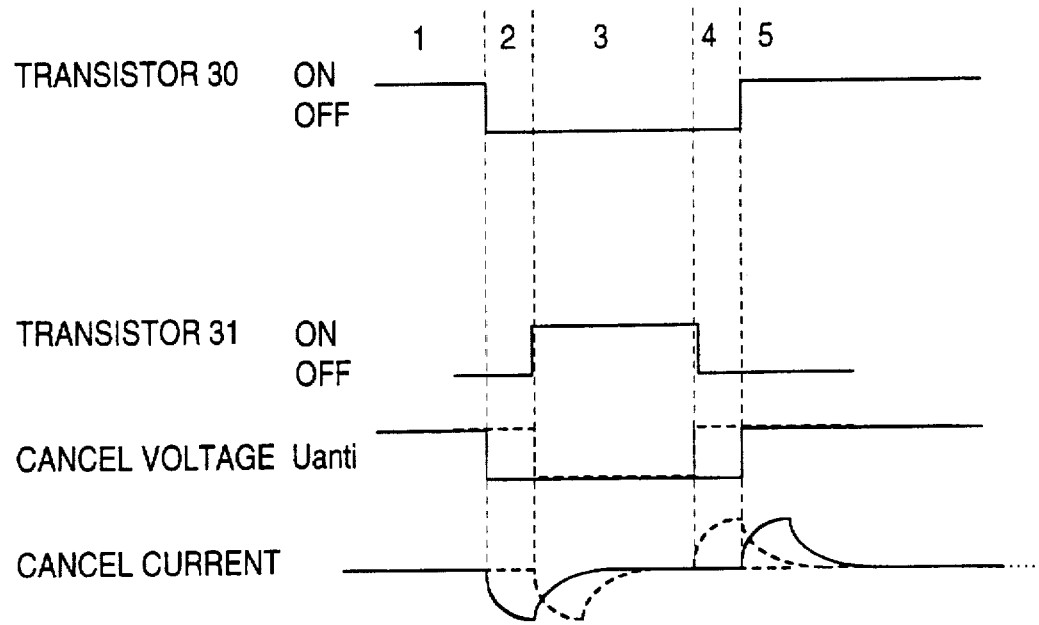
FIG. 23B is an equivalent impedance circuit of a leakage preventive apparatus as Embodiment 11 of the invention.

The operation of FIG. 23(a) will be described by reference to FIG. 23(b). When 1→2 in FIG. 23(b), a transistor 30 is changed from on→off. When 2→3, moreover, a transistor 31 is changed from off→on. At this time, the phase voltage Uanti is changed from H→L at the timing shown by a dotted line or a straight line, depending on the direction in which the current flows into 37 and 38. Due to this voltage variation, the cancel current flows into 34, 35, 36. In this case, the value of each impedance is set at a value entirely equivalent to the main body in order to completely cancel the leakage current of the main body. In the compressor motor of a room air-conditioner, 38 ranges from several to several tens of mH; 37, from several to several tens of ohms; 34, from several k to several tens of k ohms; 35, from several to several tens of mH; and 36, from several thousands of p to several ten-thousands of pF.

When 3→4→5, the logic is inverted and the transistor 31 is changed from on→off and the transistor 30 is changed from off→on. At this time, the phase voltage Uanti is changed from L→H at the timing shown by a dotted line or a straight line, depending on the direction in which the current flows through 37 and 38. Then the cancel current completely equal in size to and inverted from the aforementioned current flows. Entirely the same operation is also performed in the other phases.

Embodiment 12

Figure 24A:
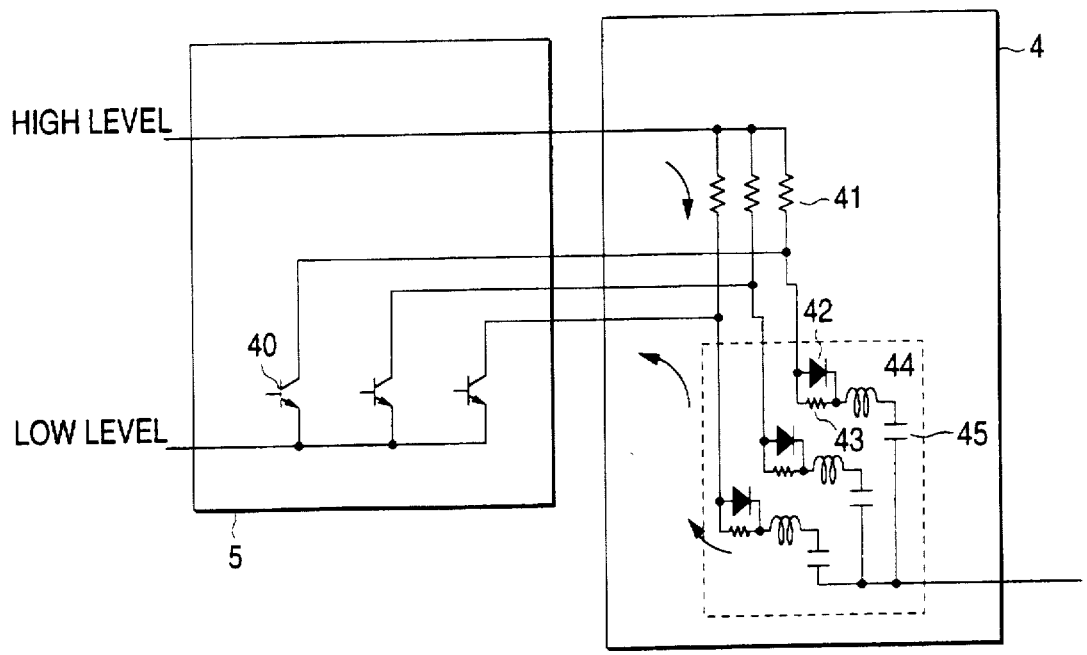
FIG. 24A is a diagram illustrating the operation of a switching unit.

FIG. 24(a) shows circuits of the switching unit and the impedance unit equivalent to the leakage impedance of the main body in the leakage preventive apparatus as an embodiment of the present invention. Reference numeral 40 denotes a transistor; 41, 43, resistors; 42, a diode; 44, a coil; and 45, a capacitor. The same effect as described above is obtainable even though the impedance 4 equivalent to the leakage impedance of the main body and the switching unit in Embodiments 1 through 11 are arranged as shown in FIG. 24. With this arrangement, the transistor is subjected to switching so that the voltage variation is caused opposite to the variation of the phase voltage of the main body.

With the arrangement as described above, the number of component parts in the switching unit is decreased and the leakage preventive apparatus obtained is less expensive than those referred to in Embodiments 1 through 11.

In other words, the cancel current flows as shown in FIG. 11 due to the presence of the capacitor 44 and so forth.

The inverted voltage of the main body may be at each of the terminal point and the point A of the equivalent impedance in the main body 1 of FIG. 23(a); 37, 38 are provided in FIG. 23 for this purpose.

Figure 24B:
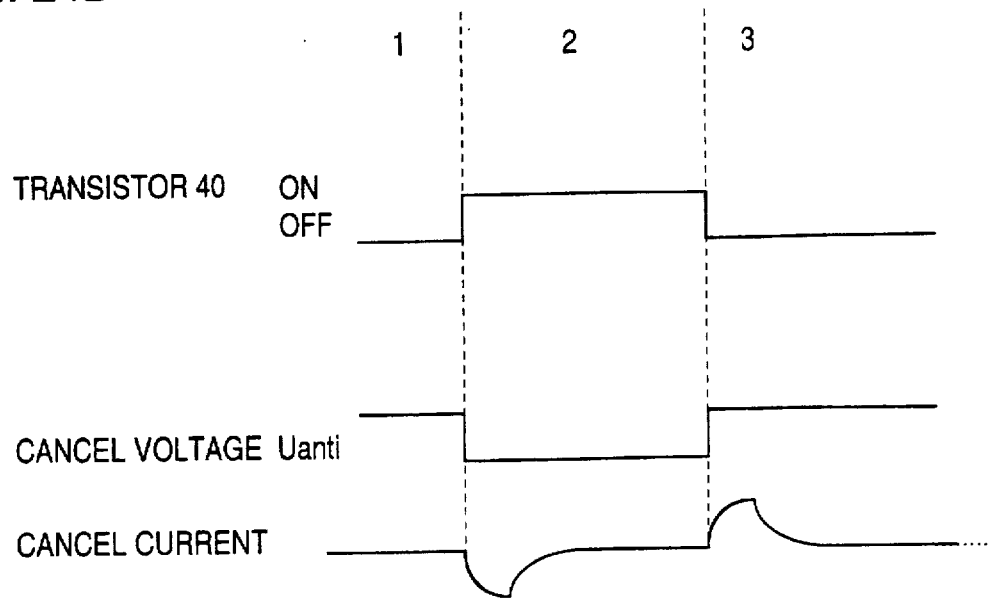
FIG. 24B is an equivalent impedance circuit of a leakage preventive apparatus as Embodiment 12 of the invention.

The operation of FIG. 24(a) will be described by reference to FIG. 24(b). When 1→2, the transistor 40 is changed from off→on. The phase voltage Uanti then is changed from H→L. The cancel current flows through 45→44→43→40 in this order because of this voltage variation. In this case, the value of each impedance is set at a value entirely equivalent to the main body in order to completely cancel the leakage current of the main body. In the compressor motor of a room air-conditioner, 41, 43 range from several k to several tens of k ohms; 44, from several to several tens of mH; and 45, from several thousands of p to several ten-thousands of pF.

When 2→3, the logic is inverted and the transistor 40 is changed from on→off. At this time, the phase voltage Uanti is chanted from L→H and the cancel current completely equal in size and entirely inverse in direction flows through 41→42→44→45. Entirely the same operation is also performed in the other phases. The transistor 40 in the circuit above is a switching means which is opened and closed at predetermined timing and the resistance values of the resistors 41 and 43 are equal. Moreover, the diode 42 is provided so as to change the path.

Embodiment 13

Figure 25A:
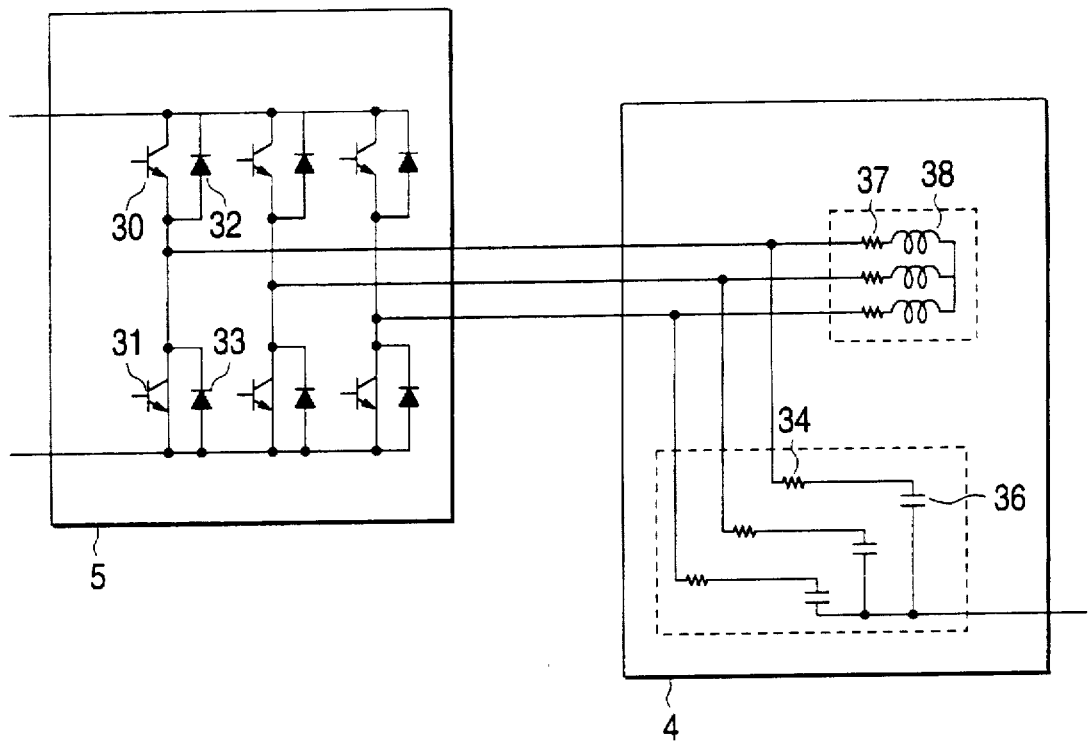
FIGS. 25A and 25B are circuit diagrams of switching units and impedance equivalents to leakage impedance of the main body in a leakage preventive apparatus as Embodiment 13 of the invention.
Figure 25B:
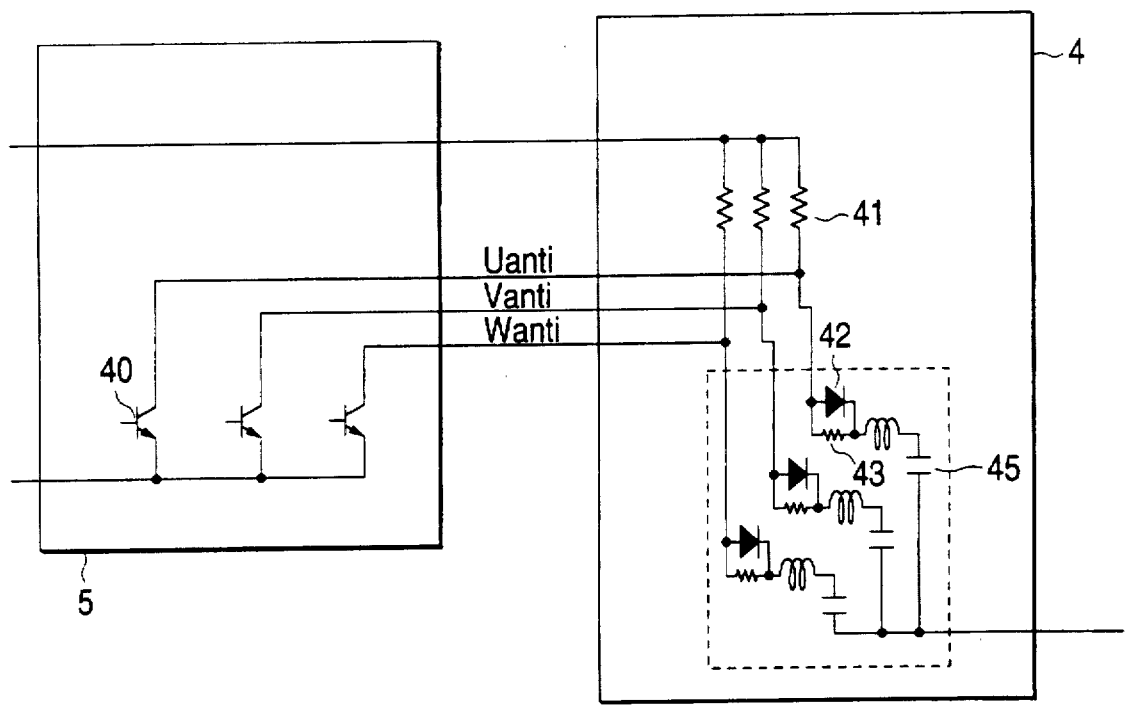

The same effect as described above is obtainable even though the impedance 4 equivalent to the leakage impedance of the main body and the switching unit in Embodiments 1 through 12 are arranged as shown in FIG. 25. Then the voltage variation of each transistor in the switching unit is smoothed.

By smoothing the switching operation of the transistor without using a coil like this, the number of component parts in the switching unit becomes decreased and the leakage preventive apparatus obtained is less expensive than those referred to in Embodiments 1 through 12.

The operation shown in FIG. 25 is similar to those shown in FIGS. 23, 24 and L44, 35 of FIGS. 23, 24 have been omitted therein. Even with the omission of L from the circuit, the presence of the additional impedance allows coils as the most expensive parts to be dispensed with, though the intended effect is slightly reduced.

Embodiment 14

Figure 26:
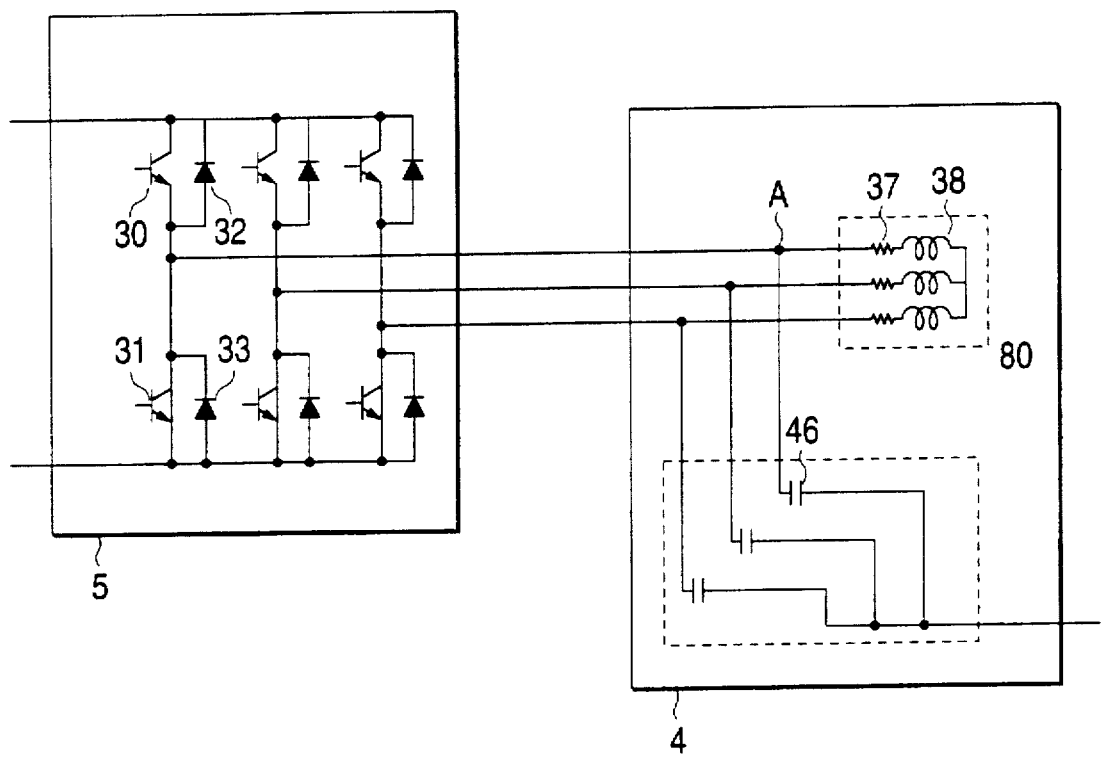
FIG. 26 is a circuit diagram of a switching unit and an impedance equivalent to leakage impedance of the main body in a leakage preventive apparatus as Embodiment 14 of the invention.
Figure 27:
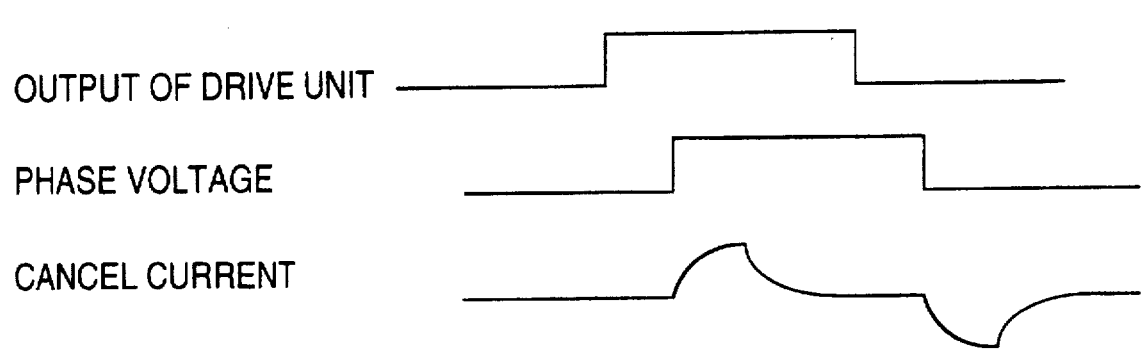
FIG. 27 is a diagram illustrating operating waveforms according to the present invention.

FIG. 26 shows circuits of the switching unit and the impedance unit equivalent to the leakage impedance of the main body in the leakage preventive apparatus as an embodiment of the present invention. Reference numeral 46 in FIG. 26 denotes a capacitor. The same effect as described above is obtainable even though the impedance 4 equivalent to the leakage impedance of the main body and the switching unit in Embodiments 1 through 12 are arranged as shown in FIG. 26. At this time, the voltage variation of each transistor of the switching unit 1 is smoothed and the bus voltage is set lower than that of the main body. FIG. 27 shows operating waveforms.

By smoothing the switching operation of the transistor without using a coil and a resistor like this and setting the bus voltage lower than that of the main body, the number of component parts in the switching unit becomes decreased and the leakage preventive apparatus obtained is less expensive than those referred to in Embodiments 1 through 13. The impedances 37, 38 in the respective phases are brought together to a neutral point 80.

Embodiment 15

Figure 28:
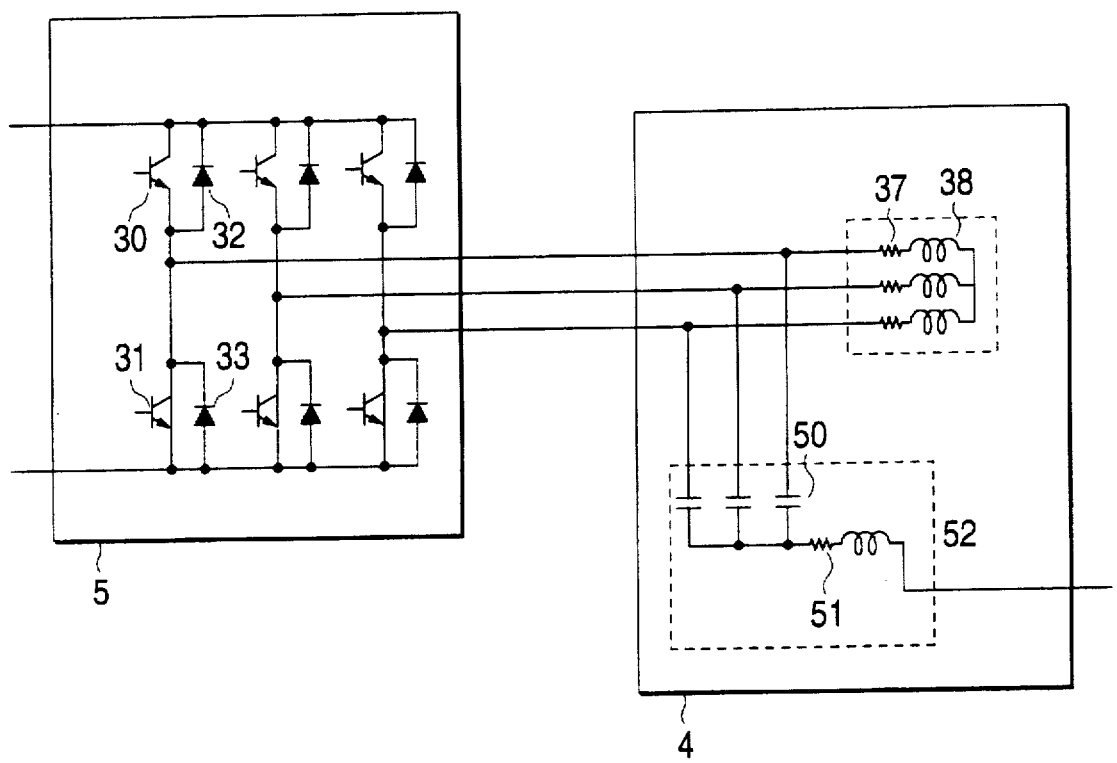
FIG. 28 is a circuit diagram of a switching unit and an impedance equivalent to leakage impedance of the main body in a leakage preventive apparatus as Embodiment 15 of the invention.

FIG. 28 shows circuits of the switching unit and the impedance unit equivalent to the leakage impedance of the main body in the leakage preventive apparatus as an embodiment of the present invention. In comparison with Embodiments 11, 12, the number of coils and resistors in the impedance unit equivalent to the leakage impedance of the main body is decreased.

As the number of component parts such as coils and resistors in the switching unit is thus decreased, the leakage preventive apparatus obtained is less expensive than those referred to in Embodiments 11, 12.

As shown in FIG. 28, the component parts of FIGS. 23, 24 other than capacitors are arranged for common use and when the phase voltages in three phases are not simultaneously varied, parts 54, 55, 56 can be arranged for common use. This operation is shown in FIG. 27.

Embodiment 16

Figure 29:
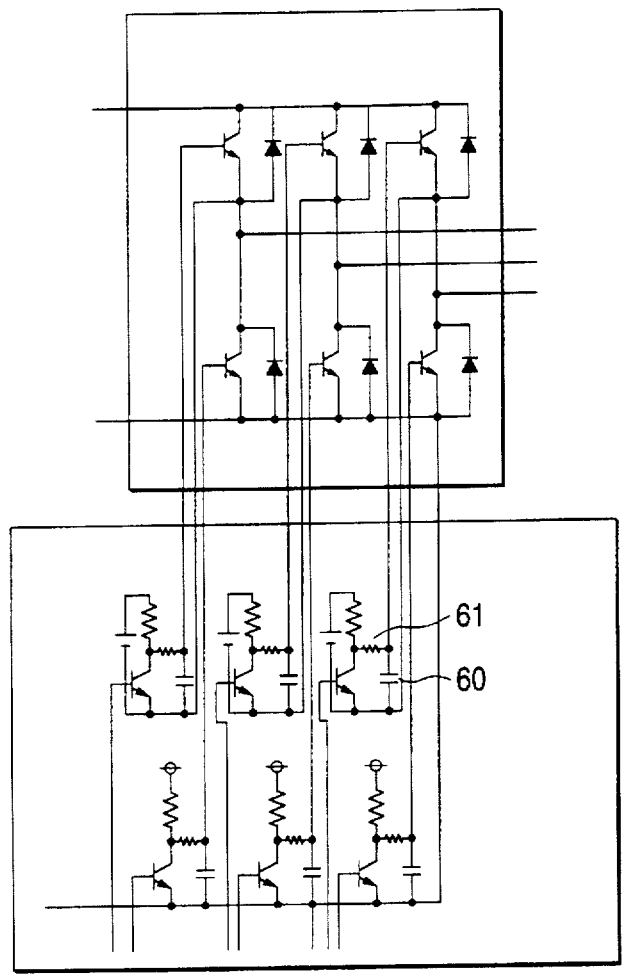
FIG. 29 is a circuit diagram of a driving unit and a switching unit in a leakage preventive apparatus as Embodiment 16 of the invention.
Figure 30:
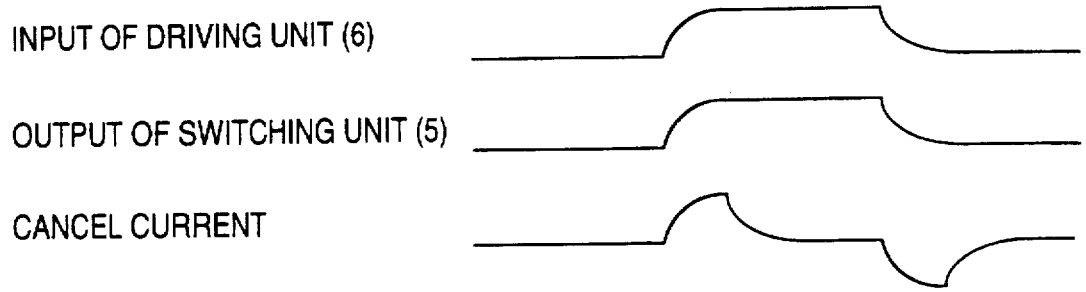
FIG. 30 is a diagram illustrating operating waveforms according to the present invention.

FIG. 29 shows circuits of the switching unit and the driving unit in the leakage preventive apparatus as an embodiment of the present invention. Reference numeral 60 denotes a capacitor; and 61, a resistor, these constituting an integrating circuit for smoothly driving the switching unit. The application of the driving unit to Embodiments 1 through 15 results in achieving the same effect as described above even though the value of a coil is lowered when the coil exists in the impedance unit equivalent to the leakage impedance of the main body. In the absence of such a coil, moreover, the cancel effect is enhanced because the operation of the transistor is smoothed so as to make the waveform of the leakage current close to that of the leakage current. FIG. 30 shows the operation of each component part then.

The leakage preventive apparatus having coils is made less expensive as their price falls, whereas what has no coils offers a greater leakage current preventive effect.

FIG. 29 shows an arrangement in which the transistor in the switching unit that has been operated by a switch is operated by an amplifier in order to obtain the cancel current likewise even without the equivalent impedance. This arrangement makes it possible to form the combination of driving, switching and equivalent impedance units into an IC on chip without afterward-attachments.

Embodiment 17

According to this embodiment of the invention, the value of each element of the impedance 4 equivalent to the leakage impedance of the main body in Embodiments 11 through 16 is made variable. FIG. 13 refers to Embodiments 11, 12. In this embodiment of the invention, the impedance 4 equivalent to the leakage impedance of the main body is made variable, so that the deviation of the load leakage impedance 8 of the main body and the impedance 4 equivalent to the leakage impedance of the main body in the leakage preventive apparatus due to variation with time, variations in the manufacturing and operation conditions can be corrected.

Figure 31:
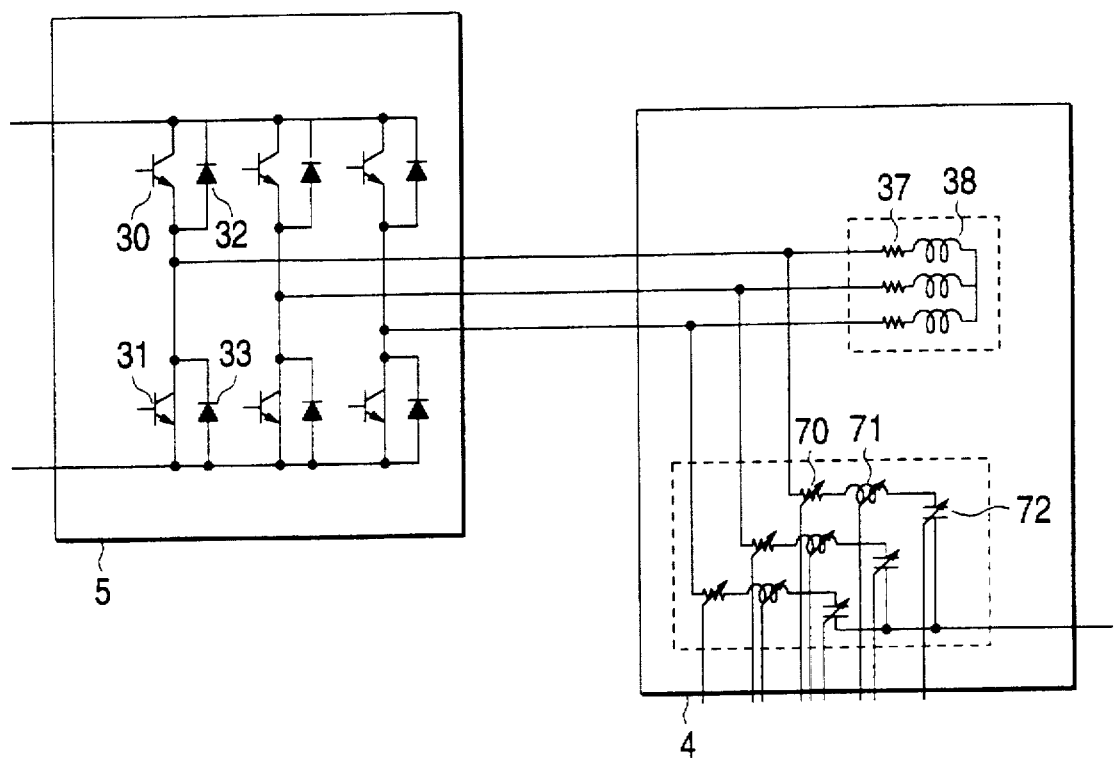
FIG. 31 is a circuit diagram of a switching unit and an impedance equivalent to leakage impedance of the main body in a leakage preventive apparatus as Embodiment 17 of the invention.

The operation shown in FIG. 31 is obtainable according to FIG. 11. At this time, each element is assumed to be a variable impedance which is electronically controllable.

Moreover, the value of each component part may be used for adjustment at the time of shipment and the adjustment of the variation of the leakage impedance due to variation in the manufacture of a compressor. If the value of each component part is used for only adjustment at the time of shipment, an ordinary variable impedance element may be fit for the purpose.

Thus an inexpensive, small-sized leakage preventive apparatus is obtainable, which apparatus is arranged without the use of an expensive large-sized component part such as a leakage preventive transformer. The leakage preventive apparatus thus obtained is highly reliable in view of dealing with variation with time, variations in the operating and manufacturing conditions.

Embodiment 18

Figure 32:
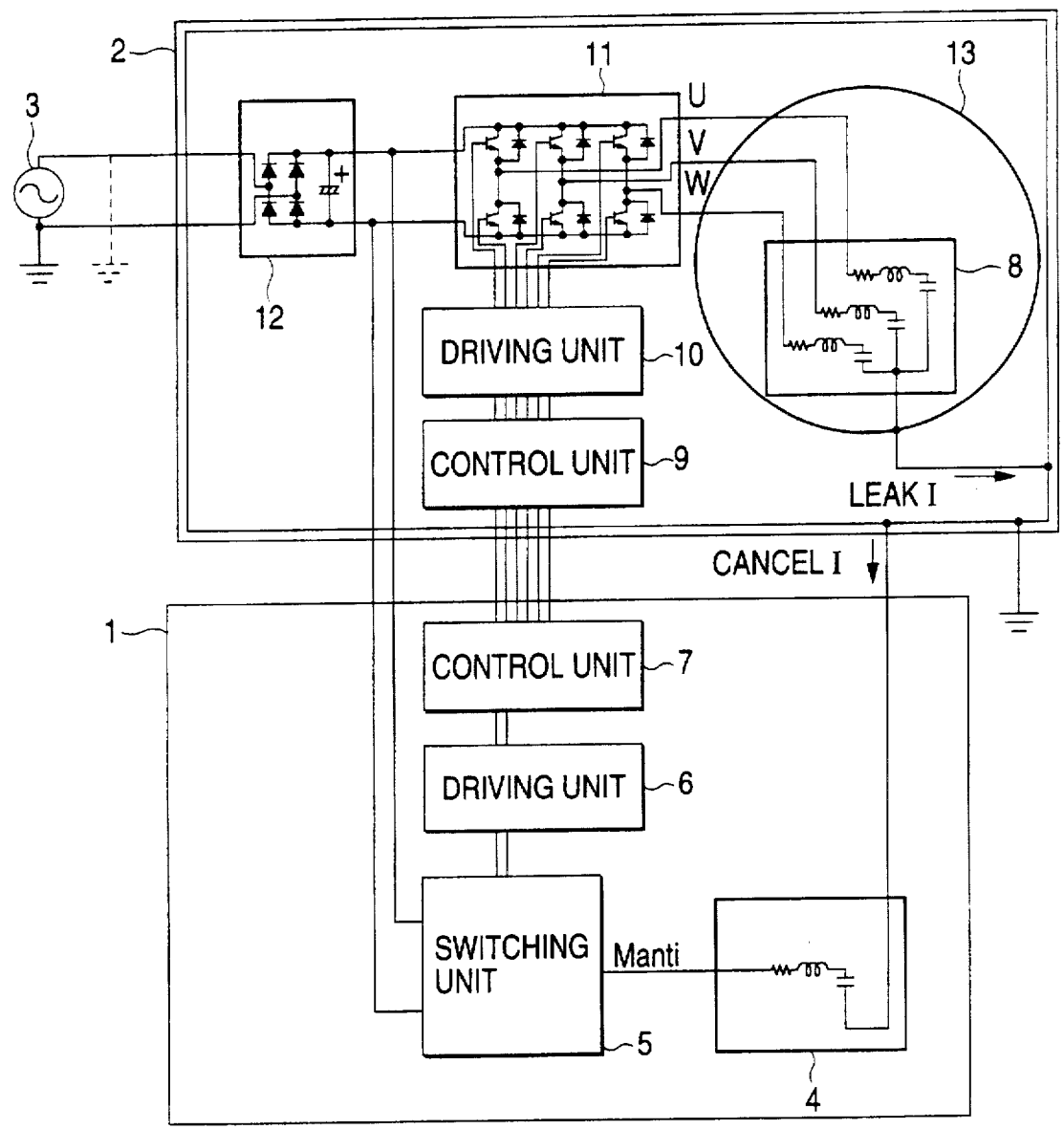
FIG. 32 is a block diagram of a leakage preventive apparatus as Embodiment 18 of the invention.

FIG. 32 is a block diagram of still another leakage preventive apparatus embodying the present invention. A load 13 in this embodiment of the invention is a three-phase DC brushless motor which is driven in a three-phase 180° power supply system.

Figure 33:
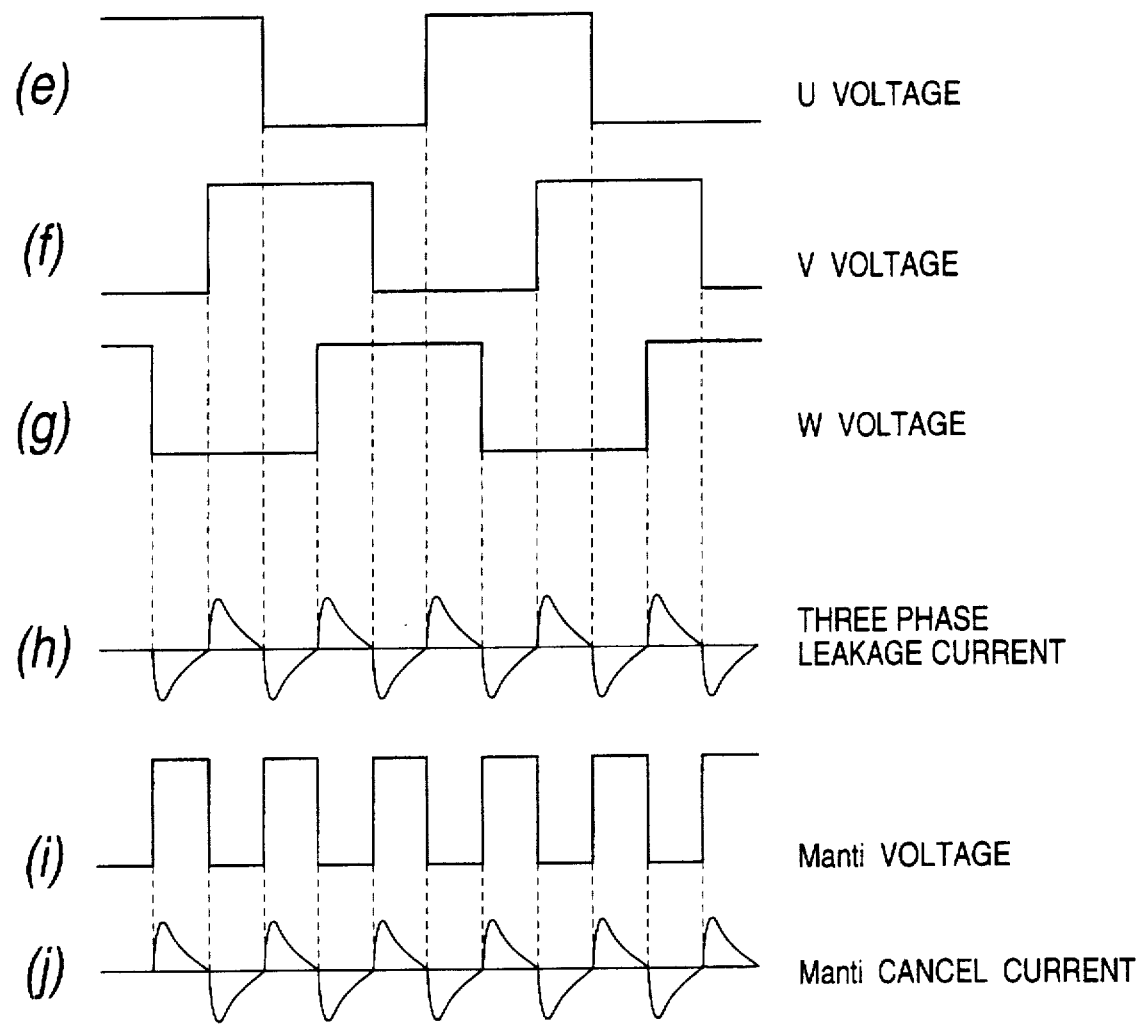
FIG. 33 is a waveform chart in respective component parts in a leakage preventive apparatus as Embodiment 18 of the invention.

FIG. 33 shows voltage/current waveforms in respective component parts in this embodiment of the invention: (e) U-phase output voltage U of the main body; (f) V-phase output voltage V of the main body; (g) W-phase output voltage W of the main body; (h) three-phase summation of leakage current; (i) the Manti voltage applied to the impedance 4 of the leakage preventive apparatus; and (j) cancel current originating from the Manti voltage variation. The abscissa represents a time base.

The operation of the leakage preventive apparatus in this embodiment of the invention will be described by reference to FIGS. 32, 33. As shown in (e), (f), (g), (h), the charge supplied to the capacitive component of the load leakage impedance 8 leaks when the leakage of the current from the compressor motor undergoes phase-voltage switching. In the leakage preventive apparatus shown in this embodiment of the invention, leakage is prevented through the steps of driving the switching circuit 5 with an anti-phase voltage of the phase voltage of the main body to generate the voltage shown in (i), applying the voltage to the impedance 4 equivalent to the load leakage impedance, and preventing leakage by letting a reverse current with respect to the leakage current of the main body flow as shown in (j).

In the case of a load whose phose voltage is not variable, the number of phases in each component part of the preventive apparatus can simultaneously be made smaller than that in the load, so that an inexpensive leakage preventive apparatus is available as the number of component parts decreases.

In other words, as shown by a dotted line of FIG. 33, it is only needed to obtain a cancel current resulting from adding the applied voltage Manti to the equivalent impedance as one serial impedance. Thus the circuit cost is reducible.

Moreover, the phase of the voltage Manti is made obtainable by ANDing the variation of each phase voltage therewith.

In reference to the load whose phase voltages are not variable simultaneously, the three-phase inverter not subjected to modulation as shown in FIG. 33 is not variable simultaneously. However, two phase voltages vary simultaneously when two-phase modulation is applied and three phase voltages vary simultaneously when three-phase modulation is applied. Since the two-phase modulation is mainly used in induction and brushless motors both, actually two circuits for three phases are most suitable. In order to make clear the difference between this embodiment of the invention and any other example, there is shown one circuit for a three-phase load.

As stated above, the total number of switches, that is, the number of transistors and that of L, C, R elements can be made smaller than the number of phases of the inverter. In other words, an inexpensive leakage preventive apparatus can be obtained by setting the number of phases of the preventive apparatus smaller than the total number of phases of the inverter.

Although three-phase loads have been exemplified in the aforementioned embodiments of the invention, the arrangement may needless to say be applicable to a single-phase load or what has any other phase as long as switching timing is simultaneously effectible. Although a description has been given of a case where the neutral point is not earthed, the present invention is also applicable to an unearthed neutral point system.

Although a description has been given of preventing the current leakage of compressors, the present invention is needless to say applicable to the prevention of current leakage from any other load to be driven by an inverter.

The aforementioned embodiment of the invention may be implemented in one and the same IC. In a case where such a leakage preventive apparatus is contained in one IC, technique of packaging high- and low-voltage arrangement at the same time will be required; however, it is easily achievable as HVIC has been put to practical use.

An extremely small-sized, inexpensive leakage preventive apparatus is obtainable provided its component parts can be incorporated in one IC. As described above, the generation of an anti-phase is ensured less costly by setting the power supply for use common to the inverter and the preventive apparatus according to the present invention in reference to FIG. 1. In each of the embodiments of the present invention, size reduction is possible without the use of any transformer at all unlike the prior art.

Embodiment 19

Figure 34:
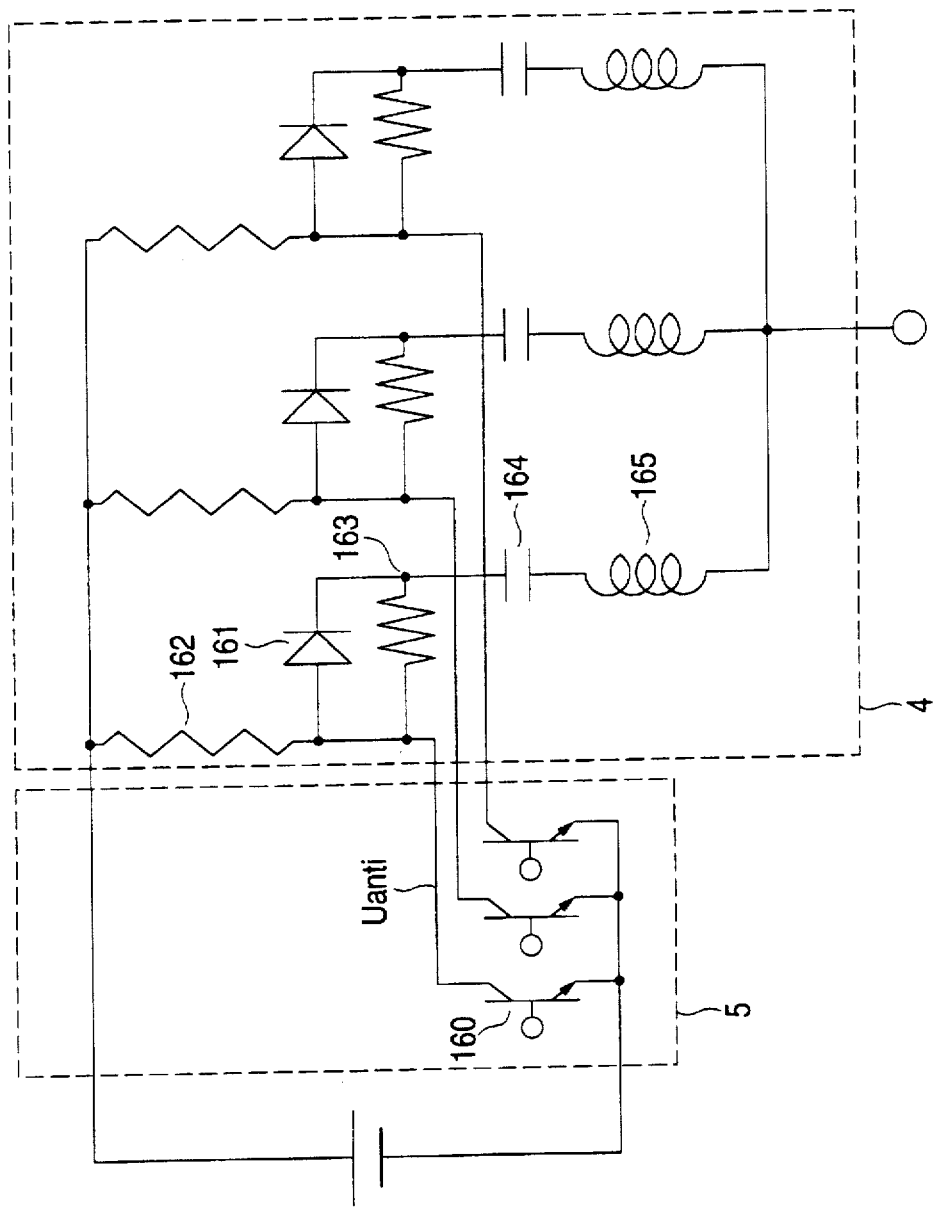
FIG. 34 is a circuit diagram of a switching unit and a leakage impedance with respect to the earth equivalent to a load in a leakage preventive apparatus as Embodiment 19 of the invention.

FIG. 34 is a circuit arrangement of the switching unit and the equivalent impedance unit equivalent to impedance with respect to earthing leakage in the leakage preventive apparatus. FIG. 34 is similar to FIG. 24 and a description to be given of this embodiment of the invention is substantially similar to what has been given of Embodiment 12.

Figure 35:
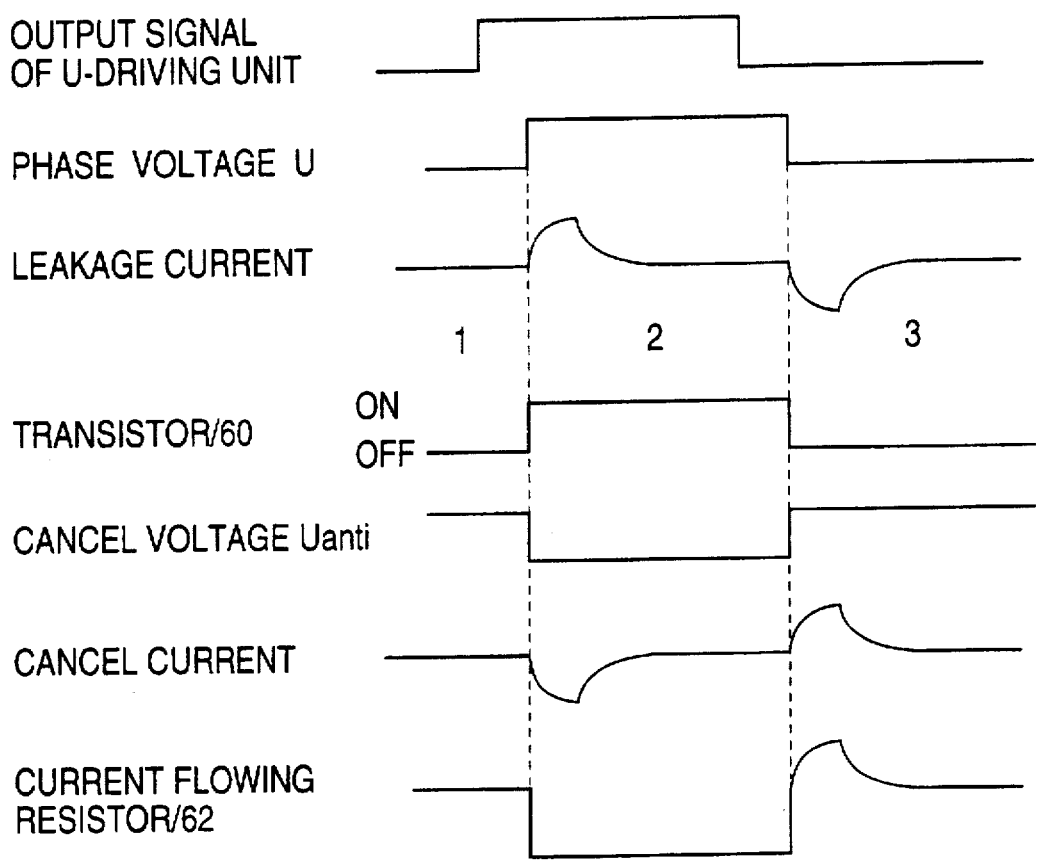
FIG. 35 is an operating timing chart of the leakage preventive apparatus as Embodiment 19 of the invention.

FIG. 35 is an operating timing chart as to each single-phase component part.

Figure 36:
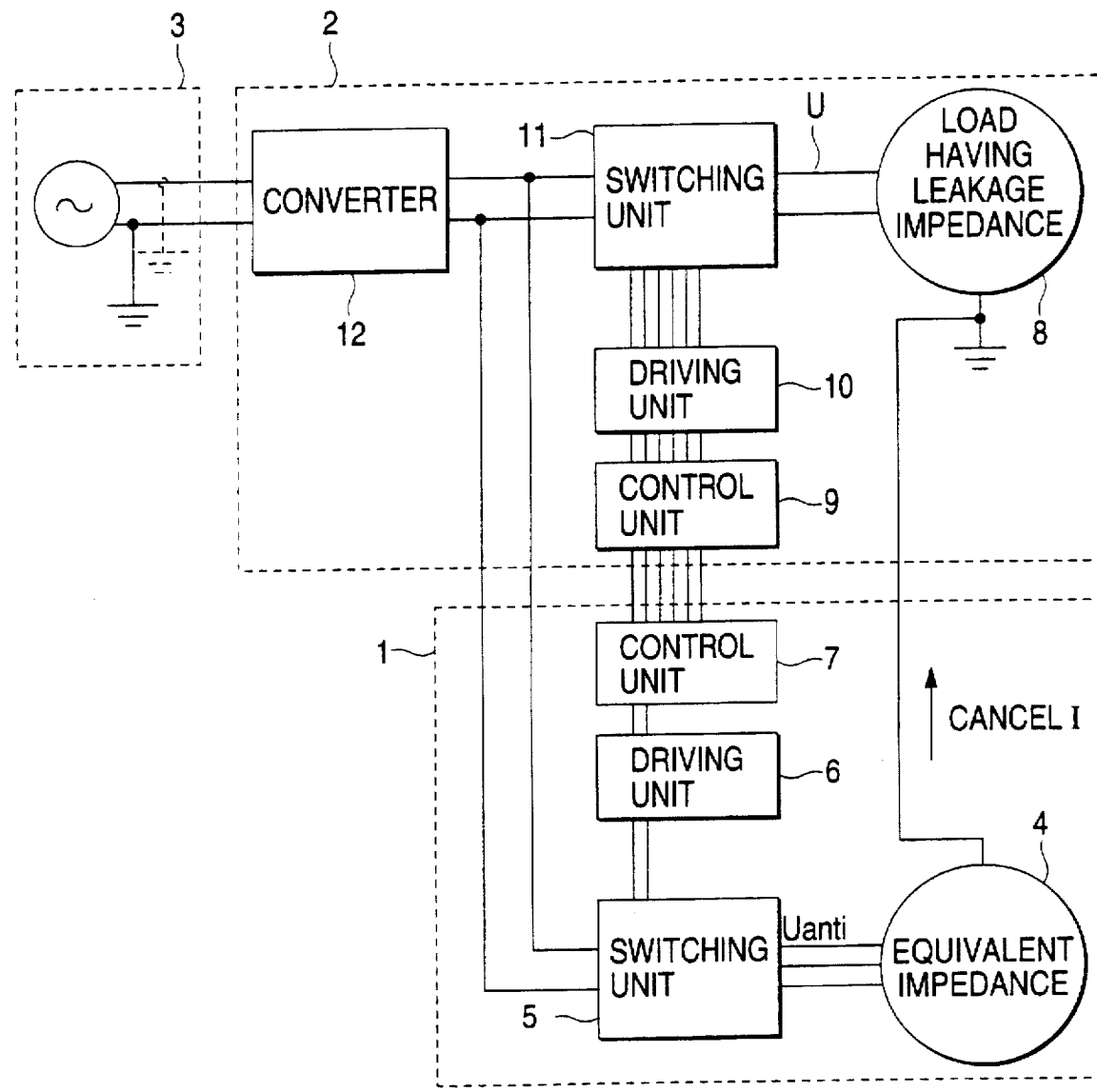
FIG. 36 is a block diagram of the leakage preventive apparatus as Embodiment 19 of the invention.

Further, FIG. 36 is an overall block diagram of the leakage preventive apparatus according to the present invention.

In FIG. 34, reference numeral 160 denotes a transistor; 161, a diode; 162, 163, resistors; 164, a capacitor; and 165, a coil.

The operation will be described with reference to FIGS. 34, 35. When 1→2, the transistor 160 is changed from off→on. The phase voltage Uanti then is changed from H→L. The cancel current which cancels the leakage current of the main body flows through 165→164→163→160 in this order. In this case, the value of each impedance is set at a value entirely equivalent to the main body in order to completely cancel the leakage current on the main body side.

When 2→3, the logic is inverted and the transistor 160 is changed from on→off. At this time, the phase voltage Uanti is changed from L→H and the cancel current completely inverse in size and different in direction flows through 162→161→164→165. Entirely the same operation is also performed in the other phases.

Thus the leakage current is prevented by giving the anti-phase voltage of the switching unit of the main body so as to generate a current that cancels the leakage current.

While the transistor 160 in the leakage preventive apparatus is held ON, the source voltage is totally applied to the resistor 162 as shown in FIG. 35 and a current irrelevant to the cancel current is kept flowing. When the impedance of the resistance component of the leakage impedance of the main body is high, power loss in the resistor 62 is small and only low resistance is sufficient to be heat resistant.

More specifically, the equivalent impedance unit is designed so that it conforms to the leakage impedance (equivalent to resistance) of the main body. When the leakage current is lowered as the capacity of the compressor, that is, the main body is reduced and as its size becomes smaller, only lower resistance is sufficient for the resistor 162, which is economical.

As the size of the compressor increases, the heat generation of the resistor 162 increases on the contrary and this is uneconomical because its resistance increases. Countermeasures will subsequently be described.

Embodiment 20

FIG. 36 is a block diagram of a leakage preventive apparatus embodying the present invention. In FIG. 36, reference numeral 1 denotes the configuration of the leakage preventive apparatus 1; 2, the constitution of the main body; and 3, the commercial power supply. In the leakage preventive apparatus 1, reference numeral 4 denotes the impedance equivalent to the leakage impedance 8 of a load in the main body; 5, the switching unit for applying voltage to the impedance 4 equivalent to the load leakage impedance; 6, the driving unit for driving the switching unit 5; and 7, the control unit for generating a switching pattern. The output of the converter 12 of the main body is used as the power source of the switching unit 5 of the leakage preventive apparatus. In this embodiment of the invention, the same microprocessor is used to realize the control unit 9 of the main body and the control unit 7 of the leakage preventive apparatus, and controlled by a built-in program therein. Moreover, the driving unit 6 and the switching unit 5 are formed of electronic parts of low current capacitance (about 500 mA or lower). In this case, the arrangement above is applied to a three-phase compressor motor.

Figure 37:
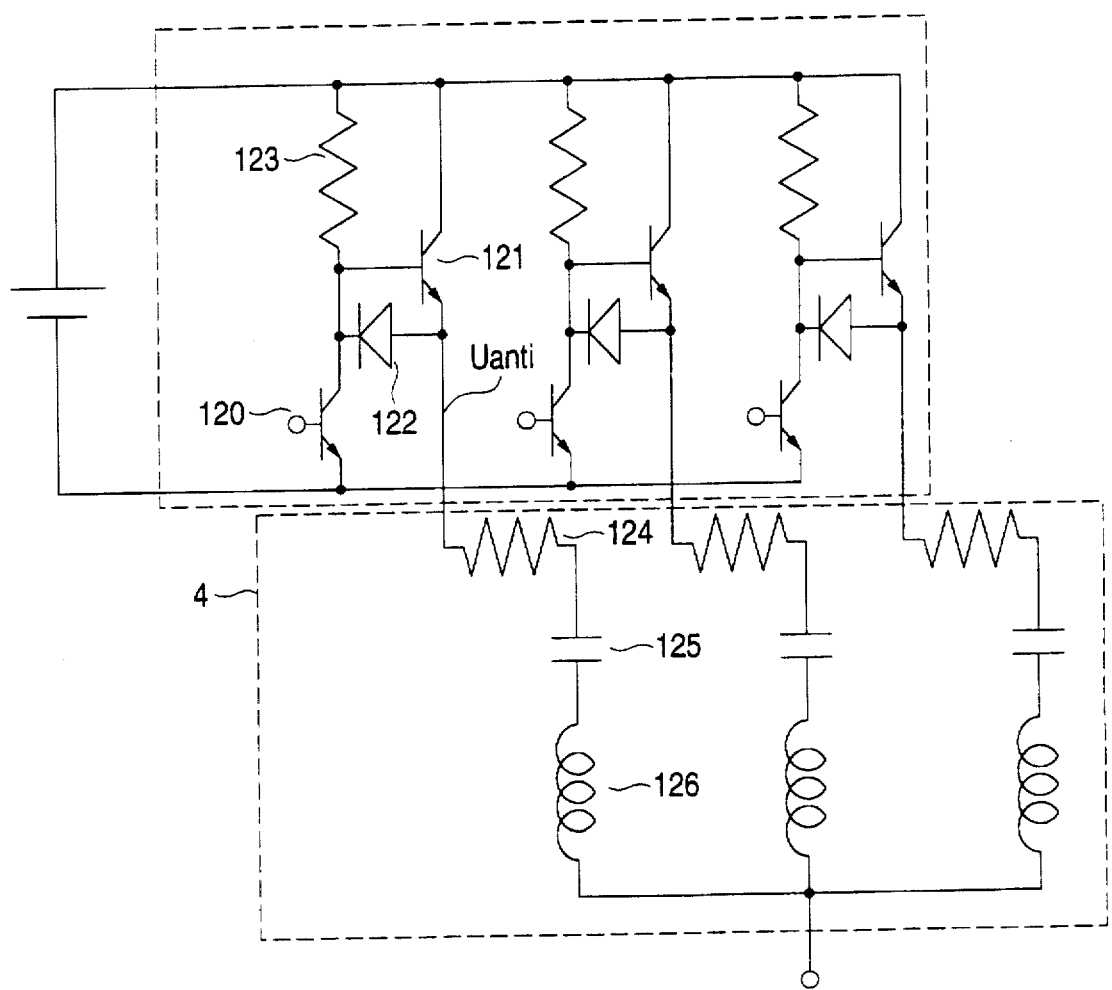
FIG. 37 is a circuit diagram of the switching unit and the leakage impedance with respect to the earth equivalent to the load in the leakage preventive apparatus as Embodiment 19 of the invention.

FIG. 37 is a circuit arrangement of the switching unit and the equivalent impedance unit equivalent to impedance with respect to earthing leakage in the leakage preventive apparatus in this embodiment of the invention. In FIG. 37, reference numerals 120, 121 denote transistors; 122, a diode; 123, 124, resistors; 125, a capacitor; and 126, a coil.

Figure 38:
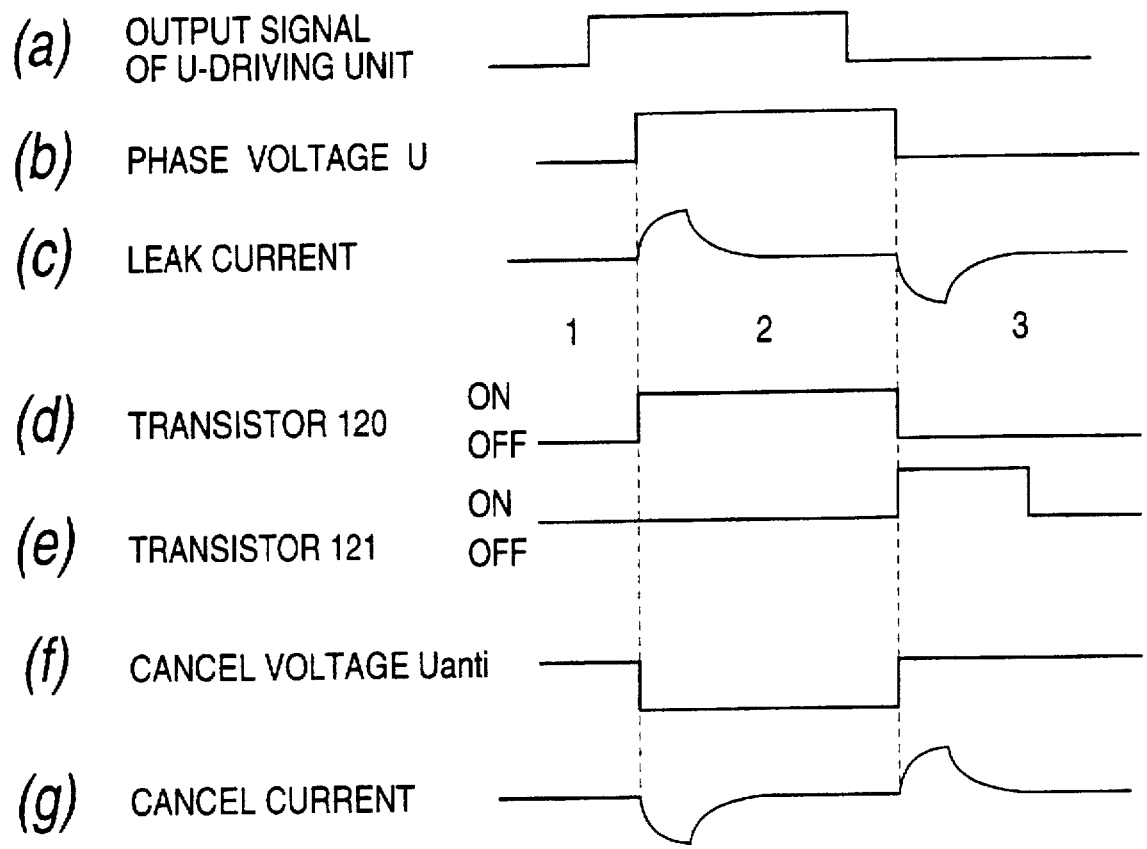
FIG. 38 is an operating timing chart in respective component parts of the leakage preventive apparatus as Embodiment 19 of the invention.

FIG. 38 is an operating timing chart in each component part in this embodiment of the invention: (a) U-phase output voltage of the main body; (b) leakage current originating from U-voltage variation; (c) the Uanti voltage applied to the U-phase component of the impedance 4 of the leakage preventive apparatus; and (d) cancel current originating from Uanti voltage variation. Further, (e), (f) each refer to on/off states of 120, 121. The abscissa represents a time base.

The operation will be described with reference to FIGS. 36, 37, 38 with attention directed to the U-phase. When 1→2 of FIG. 38(b), the transistor 120 is changed from off→on. The phase voltage Uanti then is changed from H→L. The cancel current which cancels the leakage current of the main body flows through 126→125→124→122→120 in this order. In this case, the value of each impedance is set at a value entirely equivalent to the main body in order to completely cancel the leakage current on the main body side.

When 2→3, the logic is inverted and the transistor 120 then is changed from on→off. Simultaneously, the transistor 121 is changed from off→on and while the cancel current is kept flowing 121 is turned ON and it is closed when the cancel current is suspended and the phase voltage Uanti is changed from L→H. Then the cancel current completely opposite in size to 1→2 and different in direction flows through 121→124→125→126. Entirely the same operation is also performed in the other phases.

Thus the leakage current is prevented by giving the anti-phase voltage of the switching unit of the main body so as to generate a current that cancels the leakage current.

The resistor 123 is used to drive the transistor 121 and a greater value can be set thereto, irrespectively of the resistance component of the equivalent impedance. The diode 122 prevents the reverse voltage across the base.emitter of the transistor 121.

With this arrangement, this apparatus free from component parts causing a great power loss can be installed even in equipment in which the resistance component of the leakage impedance is small. Thus an inexpensive, small-sized, highly efficient leakage preventive apparatus is obtainable.

Since component parts of small capacitance are usable, it is possible to incorporate them into one IC and then the leakage preventive apparatus may be made less expensive and small-sized.

Embodiment 21

FIG. 36 is a block diagram of a leakage preventive apparatus embodying the present invention. In FIG. 36, reference numeral 1 denotes the configuration of the leakage preventive apparatus 1; 2, the constitution of the main body; and 3, the commercial power supply. In the leakage preventive apparatus 1, reference numeral 4 denotes the impedance equivalent to the leakage impedance 8 of a load in the main body; 5, the switching unit for applying voltage to the impedance 4 equivalent to the load leakage impedance; 6, the driving unit for driving the switching unit 5; and 7, the control unit for generating a switching pattern. The output of the converter 12 of the main body is used as the power source of the switching unit 5 of the leakage preventive apparatus. In this embodiment of the invention, the same microprocessor is used to materialize the control unit 9 of the main body and the control unit 7 of the leakage preventive apparatus, and controlled by a built-in program therein. Moreover, the driving unit 6 and the switching unit 5 are formed of electronic parts of low current capacitance (about 500 mA or lower). In this case, the arrangement above is applied to a three-phase compressor motor.

Figure 39:
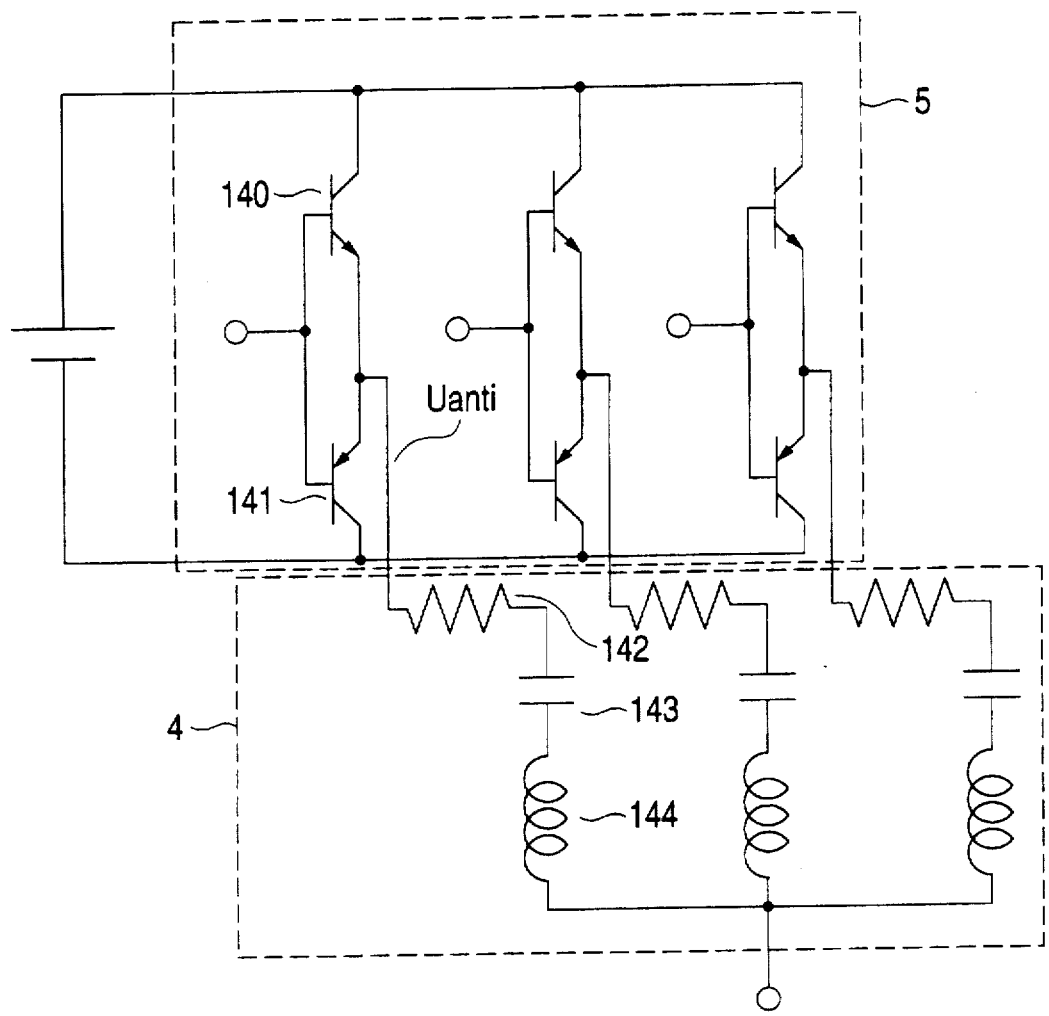
FIG. 39 is a circuit diagram of a switching unit and a leakage impedance with respect to the earth equivalent to a load in a leakage preventive apparatus as Embodiment 20 of the invention.

FIG. 39 is a circuit arrangement of the switching unit and the equivalent impedance unit equivalent to impedance with respect to earthing leakage in the leakage preventive apparatus in this embodiment of the invention. In FIG. 39, reference numerals 140, 141 denote transistors; 142, a resistor; 143, a capacitor; and 144, a coil.

FIG. 38 is an operating timing chart in each component part in this embodiment of the invention: (a) U-phase output voltage of the main body; (b) leakage current originating from U-voltage variation; (c) the Uanti voltage applied to the U-phase component of the impedance 4 of the leakage preventive apparatus; and (d) cancel current originating from Uanti voltage variation. Further, (g), (h) each refer to on/off states of 140, 141. The abscissa represents a time base.

Figure 40:
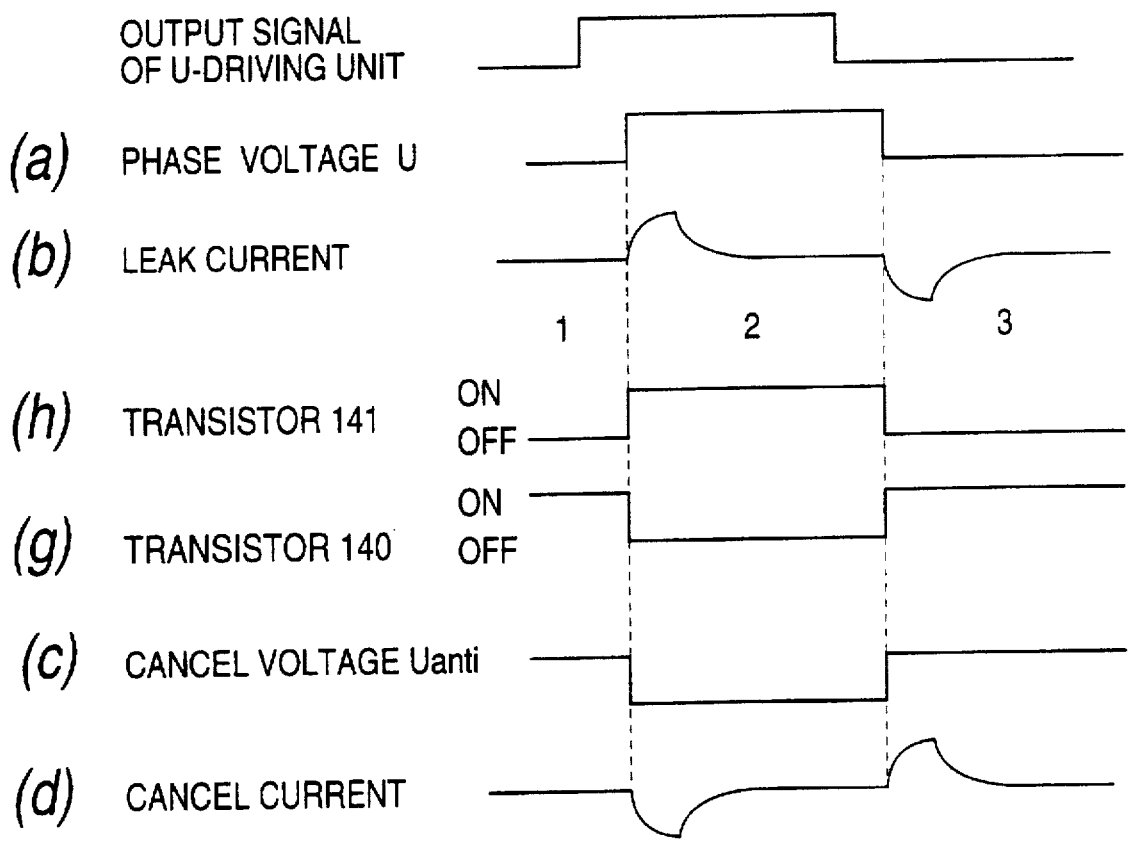
FIG. 40 is an operating timing chart in respective component parts of the leakage preventive apparatus as Embodiment 20 of the invention.
Figure 41:
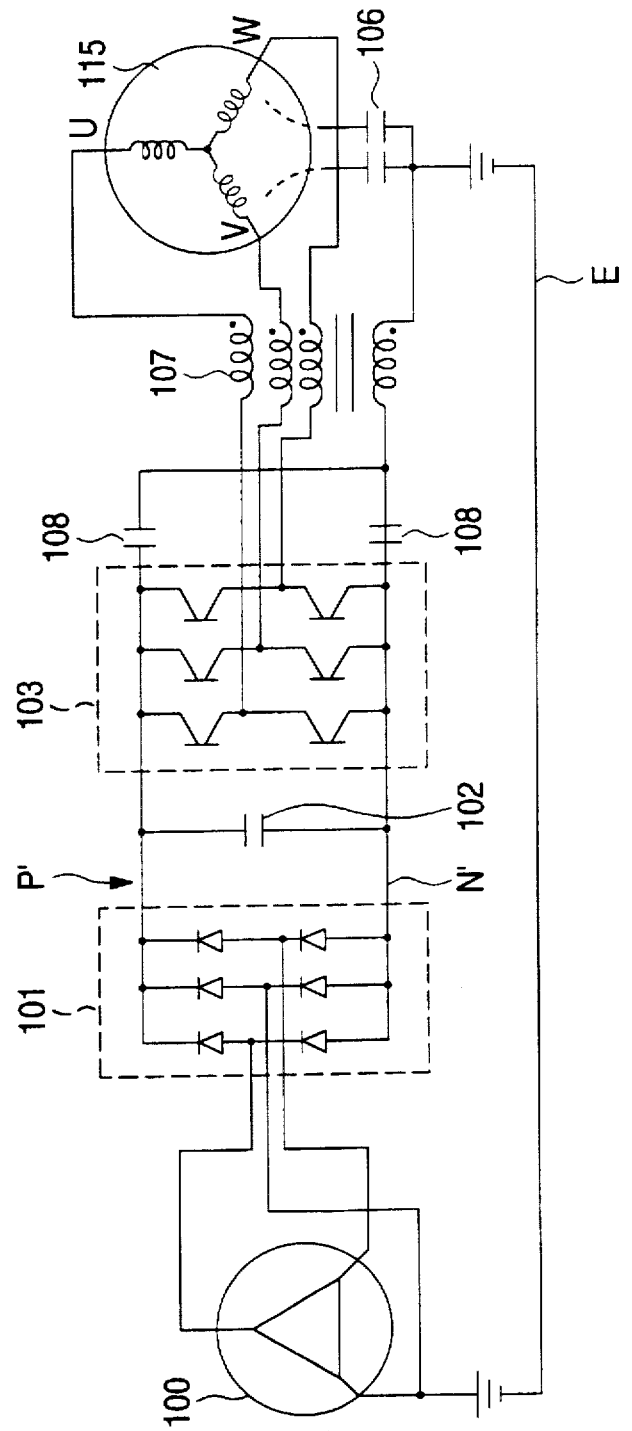
FIG. 41 is a circuit arrangement in a conventional leakage preventive apparatus.

The operation will be described with reference to FIGS. 36, 39, 40 with attention directed to the U-phase. When 1→2, the transistor 141 is changed from off→on and the transistor is changed from on→off. The phase voltage Uanti then is changed from H→L. The cancel current which cancels the leakage current of the main body flows through 144→143→142→141 in this order. In this case, the value of each impedance is set at a value entirely equivalent to the main body in order to completely cancel the leakage current on the main body side.

When 2→3, the logic is inverted and the transistor 141 then is changed from on→off and the transistor is changed from off→on and the phase voltage Uanti is changed from L→H. Then the cancel current completely opposite in size to 1→2 and different in direction flows through 120→142→143→144. Entirely the same operation is also performed in the other phases.

Thus the leakage current is prevented by giving the anti-phase voltage of the switching unit of the main body so as to generate a current that cancels the leakage current. Incidentally, the switching element 140 is of an NPN type and 141 of a PNP type.

With this arrangement, this apparatus free from component parts causing a great power loss can be installed even in equipment in which the resistance component of the leakage impedance is small. Thus an inexpensive, small-sized, highly efficient leakage preventive apparatus is obtainable.

Since component parts of small capacitance are usable with the combination of PNP and NPN elements moreover, it is possible to incorporate them into one IC and then the leakage preventive apparatus may be made less expensive and small-sized.

As set forth above, the present invention provides an inverter apparatus capable of simply and surely preventing leakage current since the earthing current is canceled by applying an anti-phase voltage in synchronization with the AC voltage generated by the inverter to an impedance equivalent to the leakage impedance of a load.

The present invention provides an inverter apparatus which is compact and capable of simply and surely preventing leakage current with the provision of the inverted voltage applying means for applying the anti-phase alternating current in synchronization with the AC voltage generated by the inverter to the impedance equivalent to the leakage impedance of the load.

The present invention provides an inverter apparatus which is easy to manufacture and usable for general purpose since the anti-phase voltage of the AC voltage of the inverter is supplied according to the switching signal of the inverter by providing the impedance equivalent to the impedance with respect to the earthing leakage of the inverter-driven load. Since the inverted signal can be formed from the driving-signal generating means, moreover, a time lag with respect to leakage current is made less than the time lag of the signal from the control unit and greater than that of the signal from the switching unit. However, as the signal is at low voltages or exits within the same circuit (in the same program), it is readily retrievable, whereby variation in the control time of the driving unit can be compensated for less costly.

The present invention provides an inverter apparatus which is easy to manufacture and capable of flexibly dealing with alteration since the impedance equivalent to the leakage impedance used to generate the cancel current comprises elements including at least a capacitor.

The present invention provides the equivalent impedance unit which is reducible to having small capacitance and easily standardized since the DC voltage can be selected freely. Particularly, the provision of a low-voltage source is possible, which allows a low withstand voltage element to be used. Therefore, the inverter apparatus is fit for integration and cost reduction.

The present invention provides an inverter apparatus which is easy to use since the voltage applied to the equivalent impedance and the like is made variable, so that the output of the inverter and leakage current variation for long-term use can be dealt with. As L-reduction with respect to the equivalent impedance is possible, the apparatus can be made compact.

The present invention provides an inverter apparatus which is highly reliable and usable for general purpose since the voltage applied to the equivalent impedance is varied in accordance with the leakage current and besides capable of surely and precisely preventing current leakage due to the variation of the load with time.

The present invention provides an inverter apparatus which is capable of preventing current leakage less costly because of the deviation of timing at which the voltage applied from the AC voltage of the inverter to the equivalent impedance unit.

The present invention provides a reliable inverter apparatus whose specification can simply be altered since the quantity of impedance is varied after the detection of the leakage current.

The present invention provides an inverter apparatus which is capable of simply and surely preventing current leakage since the delay means for generating the inverted voltage by deviating the voltage is provided.

The present invention provides a leakage preventive apparatus which is less expensive, compact and usable for general purpose.

The present invention provides a leakage preventive apparatus which is capable of surely preventing current leakage since it is compact and attachable to an inverter apparatus. Moreover, the leakage preventive apparatus is made highly reliable since the generation of the switching pattern is based on control information and since the driving unit is formed with one circuit (microcomputer).

The present invention provides a leakage preventive apparatus which is compact and less expensive and capable of generating the cancel current close to leakage current since the switching pattern of the switching unit generates the current opposite in phase to the earthing leakage current of the load.

The present invention provides a leakage preventive apparatus which is highly reliable since the leakage current is precisely dealt with after it is detected and controlled.

The present invention provides a leakage preventive apparatus capable of ensuring a wide range of switching operation since the alteration of control signal is based on information concerning earthing leakage.

The present invention provides a leakage preventive apparatus capable of ensuring the switching operation since the alteration of the signal for driving switching is based on information concerning earthing leakage.

The present invention provides a leakage preventive apparatus which is reliable and accurate since the alteration of the quantity of impedance is based on information concerning earthing leakage.

The present invention provides a leakage preventive apparatus capable of surely preventing current leakage since the applied voltage is varied by supplying the variable voltage source with earthing leakage information.

The present invention provides a leakage preventive apparatus which is less expensive and usable for general purpose to ensure the control operation since information concerning switching is obtained from the inverter driving unit.

The present invention provides a leakage preventive apparatus which is capable of preventing current leakage and usable for general purpose to ensure that the influence of noise and the like is lowered by directly utilizing information concerning the switching of the inverter. Moreover, the leakage preventive apparatus thus obtained is highly reliable and resistant to variation with time since the cancel current is likely to conform to the leakage current.

The present invention provides a leakage preventive apparatus capable of preventing current leakage with accuracy since the control unit is provided with the delay means. Particularly, the leakage preventive apparatus thus obtained offers excellent accuracy since time delay incorporates variations in the characteristics of the signal-delaying element such as a switching element and a photocoupler for adjusting purposes.

The present invention provides a reliable leakage preventive apparatus which is capable of surely and effectively delaying switching since the driving unit is provided with the delay means.

The present invention provides a leakage preventive apparatus which is arranged so that maintenance is easily carried out since each element is provided for the equivalent impedance unit.

The present invention provides a compact leakage preventive apparatus as the leakage impedance circuit is simple in construction.

The present invention provides a leakage preventive apparatus simple in construction with simplified equivalent circuits.

The present invention provides a leakage preventive apparatus which is less expensive since the equivalent impedance is simple.

The present invention provides a leakage preventive apparatus which is less expensive since the equivalent impedance is obtainable with the reduced number of component parts by arranging component parts for common use.

The present invention provides a leakage preventive apparatus which is less expensive and compact since an integrating circuit is used for the driving unit, whereby delay in the leakage current, even though insufficient, against the drastic variation of the phase voltage can be created without using a coil, for example.

The present invention provides a reliable leakage preventive apparatus capable of dealing with variations in leakage current characteristics since the value of each element of the equivalent impedance is made variable.

The present invention provides an economical leakage preventive apparatus which is obtainable with the reduced number of component parts.

The present invention provides a leakage preventive apparatus which is readily mass-produced, less expensive, compact and attachable to any place since each member of the leakage preventive apparatus can be subjected to integration.

The present invention provides an inverter apparatus whose reliability is improvable since the inverter control unit and current leakage prevention can be made compatible.

The present invention provides a leakage preventive method wherein current leakage prevention is effected simply and less costly since the earthing current is canceled by generating an equivalent current.

The present invention provides a precise leakage preventive method since it is caused to follow leakage current variation.

The present invention provides an inverter apparatus wherein the inverter obtained is capable of driving an less expensive, substantially free from current leakage motor for a compressor. Moreover, the inverter apparatus has a great effect on environment since it can promote the adoption of flon without containing chlorine as a refrigerant medium in a refrigeration cycle, which refrigerant medium mainly contain hydrofluorocarbon or hydrocarbon or a mixture thereof.

The present invention provides a leakage preventive apparatus capable of preventing current leakage even though leakage current increases in quantity as in a case where the size of a compressor is large since the leakage preventive apparatus is compact.

The present invention provides a leakage preventive apparatus whose size is minimized since the combination of PNP and NPN can be used to make up the leakage preventive apparatus with component parts fit for integration.

What is claimed is:

1. An electric leakage preventive apparatus for use in an inverter device, comprising:
    an equivalent impedance unit having an impedance equivalent to an impedance of a load with respect to an earthing leakage of the load driven by the inverter, one end of the equivalent impedance unit being earthed, and
    inverted voltage applying means which is connected to the other end of the equivalent impedance unit for applying an anti-phase alternating current in synchronization with an AC voltage generated by the inverter to said equivalent impedance unit.

2. The leakage preventive apparatus as claimed in claim 1, wherein said inverted voltage applying means comprises:

driving signal generating means for generating a reversal signal to the AC voltage in response to a switching control signal for causing AC voltage in the inverter; and switching means for converting direct current from an DC power supply into an anti-phase voltage of the AC voltage in response to the reversal signal from the driving signal generating means.

3. The leakage preventive apparatus as claimed in claim 1, wherein said inverted voltage applying means comprises:

switching means for switching direct current from a DC power supply to convert the direct current into the alternating current; and control means which is connected to the inverter for generating AC voltage to be applied to the driving load, for generating an anti-phase voltage signal in synchronization with the AC voltage to drive the switching means.

4. The leakage preventive apparatus as claimed in claim 3, wherein said control means comprises:

a driver for driving the switching unit, and a controller for generating a switching pattern of the switching unit on the basis of control information in the inverter and supplying the switching pattern to the driving unit.

5. The leakage preventive apparatus as claimed in claim 4, wherein said control information is a control signal being supplied to a controller in the inverter.

6. The leakage preventive apparatus as claimed in claim 4, wherein said control information is a driving signal being supplied to a driver in the inverter.

7. The leakage preventive apparatus as claimed in claim 4, wherein said control information is a switching signal being supplied to a switching unit in the inverter.

8. The leakage preventive apparatus as claimed in claim 3, wherein the DC power supply is provided in different from the DC power supply of the inverter, a voltage being different from the voltage switched by the inverter.

9. The leakage preventive apparatus as claimed in claim 3, further comprising leakage current detecting means for detecting information concerning the earthing leakage of the inverter-driven load, wherein the information is supplied to said control means so as to alter the operation of the switching unit.

10. The leakage preventive apparatus as claimed in claim 3, further comprising leakage current detecting means for detecting information concerning the earthing leakage of the inverter-driven load, wherein leakage information is supplied to said equivalent impedance means so as to alter the quantity of impedance of the equivalent impedance unit.

11. The leakage preventive apparatus as claimed in claim 3, further comprising leakage current detecting means for detecting information concerning the earthing leakage of the inverter-driven load, wherein a variable power supply is used as the power supply of the switching unit and wherein the leakage information is supplied to said variable power supply so as to alter the voltage supplied to the switching unit.

12. The leakage preventive apparatus as claimed in claim 3, wherein said control means has a delay means.

13. The leakage preventive apparatus as claimed in claim 3, wherein said equivalent impedance unit comprises:

a first leakage impedance circuit for generating the transient current provided between each switching means and the earth, and a second leakage impedance circuit for generating an anti-phase transient current of the transient current provided between the other end of the DC power supply and the earth, wherein part of the elements constituting the first and second leakage impedance circuits is arranged for common use.

14. The leakage preventive apparatus as claimed in claim 3, comprising:

first switching means which is connected to one end of the DC power supply and used for generating an anti-phase voltage with respect to each phase of the inverter-driven load, a first leakage impedance circuit for causing a transient current to be generated from the earth to the first switching means, and a second leakage impedance circuit for causing an anti-phase transient current of the transient current to be generated from second switching means toward the earth, wherein part of the elements constituting the first and second leakage impedance circuits is arranged for common use.

15. The leakage preventive apparatus as claimed in claim 3, comprising:

a PNP type switching element connected to one end of the DC power supply, an NPN type switching element connected to the other end of the DC power supply, and an earthing leakage impedance circuit equivalent to the inverter-driven load connected from between the two switching elements to the earth.

16. A leakage preventive method comprising the steps of:

applying AC voltage generated by an inverter to a driving load, generating a phase-inverted voltage in synchronization with the AC voltage, setting an equivalent impedance unit into which a current equivalent to the earthing leakage current caused to flow when the AC voltage is applied to the driving load is made to flow when the inverted voltage is applied, and earthing the driving load and the equivalent impedance so that the earthing leakage current and the equivalent current can cancel each other.

17. A leakage preventive method as claimed in claim 16, further comprising the step of varying the voltage applied to the equivalent impedance unit so as to make the voltage follow the variation of the current which leaks from the inverter-driven load into the earth.

* * * * *